United States Patent
Naito et al.

(10) Patent No.: US 8,537,154 B2
(45) Date of Patent: Sep. 17, 2013

(54) ATTRACTION SYSTEM AND ATTRACTION PROVIDING METHOD

(75) Inventors: Jun Naito, Tokyo (JP); Akira Hoshino, Tokyo (JP); Mitsunori Kikutake, Tokyo (JP); Hisashi Maruoka, Tokyo (JP); Hisashi Inaba, Tokyo (JP); Masao Takebayashi, Tokyo (JP); Keiji Yanagiya, Tokyo (JP)

(73) Assignees: Dentsu, Inc., Tokyo (JP); Dentsu Tec, Inc., Tokyo (JP); Na-Ru Corporation, Tokyo (JP)

( * ) Notice: Subject to any disclaimer, the term of this patent is extended or adjusted under 35 U.S.C. 154(b) by 1106 days.

(21) Appl. No.: 12/066,988

(22) PCT Filed: Sep. 15, 2005

(86) PCT No.: PCT/JP2005/017057
§ 371 (c)(1),
(2), (4) Date: May 21, 2008

(87) PCT Pub. No.: WO2007/032075
PCT Pub. Date: Mar. 22, 2007

(65) Prior Publication Data
US 2009/0241433 A1 Oct. 1, 2009

(51) Int. Cl.
*G06T 15/00* (2011.01)
(52) U.S. Cl.
USPC ............... 345/419; 345/1.3; 345/4; 345/205; 345/630
(58) Field of Classification Search
USPC ............... 345/1.3, 4, 205, 419, 630
See application file for complete search history.

(56) References Cited

U.S. PATENT DOCUMENTS

| | | | | |
|---|---|---|---|---|
| 4,784,394 A | * | 11/1988 | Sumin | 273/251 |
| 6,507,353 B1 | * | 1/2003 | Huard et al. | 715/863 |
| 7,775,883 B2 | * | 8/2010 | Smoot et al. | 463/36 |
| 7,859,551 B2 | * | 12/2010 | Bulman et al. | 345/630 |

FOREIGN PATENT DOCUMENTS

| | | |
|---|---|---|
| JP | 06-110480 | 4/1994 |
| JP | 09-122353 A | 5/1997 |
| JP | 2004-153770 | 5/2004 |
| JP | 2005-115740 | 4/2005 |
| JP | 2005-250712 A | 9/2005 |

OTHER PUBLICATIONS

Mase et al, Meta-Museum: A Supportive Augmented-Reality Environment for Knowledge Sharing, ATR Media intergration & Communications research laboratories; 1996, pp. 107-110.*

Balcisoy et al, Interaction between Real and virtual Humans in Augmented reality, Proc. Computer animation 1997, pp. 31-38.*

(Continued)

*Primary Examiner* — Phu K Nguyen
(74) *Attorney, Agent, or Firm* — Pearne & Gordon LLP

(57) ABSTRACT

A theater (54) can be divided into a plurality of booths (64) by booth partition walls (68). By moving the booth partition walls (68), the plurality of booths (64) are combined to form a combined theater (66). When the theater (54) is divided in the plurality of booths (64), each booth (64) provides a booth picture in which images of visitors seated in the booth (64) are incorporated as characters. The combined theater (66) provides a combined-theater picture with the use of screens (70) of all the booths (64). Each booth (64) provides a default picture when a fault occurs in the function of generating a booth picture.

7 Claims, 20 Drawing Sheets

(56) References Cited

OTHER PUBLICATIONS

Cellerino et al, Sex Differences in Face Gender Recognition in Humans, Brain Research Bulletin 63, 2004, pp. 443-449.*
Cao et al, Gender Recognition from Body, ACM Oct. 2008, pp. 1-4.*
Moghaddam et al, Gender Classification with Support Vector Machines, 2000, pp. 1-6.*
Balcosoy et al, Augmented Reality for Real and Virtual Humans, IEEE, 2000, pp. 1-5.*
International Search Report for PCT/JP2005/017057, Nov. 30, 2005.
Morishima et al. "Reality and Communication Gap of Agent in HAI" Journal of the Japanese Society for Artificial Intelligence. Nov. 2002. pp. 687-692.vol. 17, No. 6.
Japanese Office action for counterpart application No. 2007-535355; Jun. 28, 2011.

* cited by examiner

ATTRACTION SYSTEM AND ATTRACTION PROVIDING METHOD

TECHNICAL FIELD

The present invention relates a picture-providing-type attraction system, and in particular to an attraction system capable of increasing the pleasure of visitors.

BACKGROUND ART

Various attraction systems have been installed in event sites, amusement parks and the like to give enjoyment to visitors. Such attraction systems include a system for providing a picture in a theater and the like. This kind of system is referred to as a picture-providing-type attraction system in this specification. There is also a system in which another element is combined with provision of a picture (for example, a ride is combined with a picture). Such a system is also included in the picture-providing-type system in this specification.

The picture-providing-type attraction system provides an impressive picture by making full use of state-of-the-art picture techniques. For example, by utilizing a three-dimensional CG (computer graphic) image, the visitor's feeling as if he/she were in the picture can be increased, and reality or virtual reality is provided.

Visitors are often related to a story. For example, a picture of space travel is provided on the assumption that visitors travel in space. Such elaboration of the story also contributes to increase of the visitor's feeling as if he/she were in the picture.

In the field of CG technology, there is proposed a technique for generating a CG image from an actually taken image. There is also proposed a technique for combining the CG image obtained from a taken image with another CG image.

The CG techniques related to the present invention are disclosed, for example, in "Reality and Communication Gap of Agent in HAI" by Morishima, Journal of the Japanese Society for Artificial Intelligence, Japan, The Japanese Society for Artificial Intelligence, November 2002, Vol. 17, No. 6, pp. 687-692.

DISCLOSURE OF THE INVENTION

Problems that the Invention is to Solve

Under the background described above, the inventor of the present invention has examined an attraction system which can further increase the pleasure of visitors. The conventional techniques increase the visitor's feeling as if he/she were in the picture simply by involving him in a story. Unlike such conventional techniques, the present invention make the visitor actually appear in a picture and further make the visitor act as character (performer) in the picture as described below, thereby drastically increase the visitor's feeling as if he/she were in the picture.

In a picture-providing-type attraction, the number of visitors for one show is relatively large. However, the time for one show is restricted. In such a situation, if a lot of visitors are simply made to appear in a picture, the time for each visitor is shortened, or the size of each visitor is reduced. As a result, there is a possibility that the visitors cannot have a real feeling of appearing in the picture sufficiently. The present invention also solves this problem.

An attraction system is required to appropriately cope with a fault. For example, it is desirable that provision of an attraction can be continued even if a fault occurs in a part of the attraction system. Furthermore, the attraction system is required to appropriately cope with a state of emergency.

Accordingly, one object of the present invention is to provide an attraction system which can increase the pleasure of visitors.

Another object of the present invention is to provide an attraction system which enables multiple visitors to have a real feeling of appearing in a picture sufficiently.

Still another object of the present invention is to provide an attraction system which can appropriately cope with occurrence of a fault or a state of emergency.

Means for Solving the Problems

In one aspect of the present invention, an attraction system comprises: character (cast) data generation means for generating character data which is an image of a character having an image of a visitor; attraction picture generation means for causing the character data to move in accordance with character scenario data which specifies at least one character's movement along an attraction story to generate an attraction picture in which the visitor acts as the character; and attraction picture providing means for providing the attraction picture.

The attraction system of the present invention may comprise: voice data storage means storing male voice data and female voice data of each character in the attraction picture; sex judgment means for judging sex (garden) of each visitor on the basis of the image of each visitor; selection means for selecting the male voice data or the female voice data of each character; and output means for outputting the voice of the voice data selected by the selection means; and wherein the selection means may output the voice data corresponding to the sex of the visitor assigned to the character, on the basis of the result of the judgment by the sex judgment means. The selection means is typically a mixer, to which male voice data and female voice data of each character may be inputted and from which the male voice data or the female voice data may be outputted. The mixer may output voice data corresponding to the sex of the visitor assigned to the character, on the basis of the result of the sex judgment.

In one aspect of the present invention, an attraction system comprises: a theater having a theater size changeable between the size of a plurality of adjacent booths and the size of a combined theater obtained by combining the plurality of booths; attraction picture providing means for providing an attraction picture including a booth picture provided in each of the plurality of booths and a combined-theater picture provided in the combined theater, the booth picture in the attraction picture being a picture in which one or more images of visitors seated in the corresponding booth are incorporated as characters; and theater size changing means for changing the theater size in accordance with the progress of the attraction picture so that the theater is divided into the plurality of booths when the plurality of booth pictures are provided and the plurality of booths are combined to form the combined theater when the combined-theater picture is provided.

For example, a booth picture is provided in each booth first, and, in each booth, visitors seated in the booth appear. Since the number of visitors is reduced by dividing the theater, it is possible to provide a picture in which each visitor sufficiently appears within a restricted time. Next, the booths are combined to form a combined theater. In the combined theater, a large-scaled combined-theater picture is provided.

The combined-theater picture may be a picture formed by a plurality of adjacent partial theater pictures provided on a plurality of screens provided for the plurality of booths, respectively. Each of the plurality of booths may provide the attraction picture including the booth picture and the partial theater picture. The attraction system may further comprise: a plurality of attraction picture generation means provided for the plurality of booths, respectively, each of the plurality of attraction picture generation means generating the booth picture of a corresponding booth; a plurality of default picture storage means provided for the plurality of booths, respectively, for storing a default booth picture in which the images of the visitors are not incorporated but default character images are incorporated; and a plurality of fault detection means provided for the plurality of booths, respectively, for detecting occurrence of a fault which disables generation of the booth picture; and, when the fault is detected by the fault detection means, the booth where the fault has been detected may provide the default booth picture and the partial theater picture, and the one or more booths where the fault has not been detected may provide the booth picture and the partial theater picture.

Each of the plurality of attraction picture generation means may further generate a partial theater picture in which one or more images of visitors are incorporated as characters, and the default picture storage means may store a default partial theater picture in which the images of visitors are not incorporated but default character images are incorporated, together with the default booth picture. The fault detection means may detect a fault which disables generation of the booth picture or the partial theater picture. When the fault is detected, the booth where the fault has been detected may provide the default booth picture and the default partial theater picture, and the one or more booths where the fault has not been detected may provide the booth picture and the partial theater picture.

A plurality of theaters may be provided. The plurality of theaters may be partitioned by one or more theater partition members, and the theater partition members may be removable members. The plurality of theaters may be arranged so that the visitors of the plurality of theaters meet face to face when the theater partition members are removed. The plurality of theaters may be arranged in parallel, each of the plurality of theaters being individually provided with a function of providing the attraction picture and a function of changing the theater size. The attraction system may comprise control means capable of, when a fault which disables provision of an attraction occurs in one of the plurality of theaters, stopping the functions of the theater where the fault has occurred and continuing the operation of the functions of the one or more theaters where the fault has not occurred.

The attraction system may comprise an emergency stop switch and a moving mechanism emergency stop switch. When the emergency stop switch operates, the theater size may become the size of the combined theater, the screen of the theater may be removed, a lighting apparatus may be lighted, and an emergency guide light may be lighted. When the moving mechanism emergency stop switch operates, change of the theater size may be prohibited.

In one aspect of the present invention, an attraction system comprises: a theater; one or more booth partition members for partitioning the theater into a plurality of booths; a partition moving mechanism for moving the booth partition members to combine the plurality of booths to form a combined theater; and a plurality of picture sending apparatuses provided for the plurality of booths, respectively; when the theater is divided in the plurality of booths, each of the plurality of picture sending apparatuses sends a booth picture of the corresponding booth; and when the plurality of booths are combined and the combined theater is formed, a combined theater picture is formed by a plurality of adjacent partial theater pictures sent out from the plurality of picture sending apparatuses; and the booth picture of the booth is a picture in which one or more images of visitors seated in the corresponding booth are incorporated as characters.

Each of the plurality of picture sending apparatuses provided for the plurality of booths may provide the attraction picture including the booth picture and the partial theater picture. The attraction system may further comprise: a plurality of attraction picture generation apparatuses provided for the plurality of booths, respectively, each of the plurality of attraction picture generation apparatuses generating the booth picture of the corresponding booth; a plurality of default picture storage sections provided for the plurality of booths, respectively, for storing a default booth picture in which the images of the visitors are not incorporated but default character images are incorporated; and a plurality of fault detection sections provided for the plurality of booths, respectively, for detecting occurrence of a fault which disables generation of the booth picture. When the fault is detected by the fault detection section, the picture sending apparatus may provide the default booth picture and the partial theater picture in the booth where the fault has been detected, and the picture sending apparatuses may provide the booth picture and the partial theater picture in the one or more booths where the fault has not been detected.

Each of the plurality of attraction picture generation apparatuses may further generate a partial theater picture in which one or more images of visitors are incorporated as characters, and the default picture storage section may store a default partial theater picture in which the images of visitors are not incorporated but default character images are incorporated, together with the default booth picture. The fault detection section may detect occurrence of a fault which disables generation of the booth picture or the partial theater picture. When a fault is detected, the booth where the fault has been detected may provide the default booth picture and the default partial theater picture, and the one or more booths where the fault has not been detected may provide the booth picture and the partial theater picture.

A plurality of theaters may be provided. The plurality of theaters may be partitioned by one or more theater partition members, and the theater partition members are may be removable members. The plurality of theaters may be arranged so that the visitors of the plurality of theaters meet face to face when the theater partition members are removed. The plurality of theaters may be arranged in parallel, each of the plurality of theaters being individually provided with a function of providing the attraction picture and a function of moving the theater partition members. The attraction system may comprise a control apparatus capable of, when a fault which disables provision of an attraction occurs in one of the plurality of theaters, stopping the functions of the theater where the fault has occurred and continuing the operation of the functions of the one or more theaters where the fault has not occurred.

The attraction system may comprise: an emergency stop switch and a moving mechanism emergency stop switch; a control apparatus connected to the emergency stop switch; and a moving mechanism control apparatus connected to the moving mechanism emergency stop switch and controlled by the control apparatus. When the emergency stop switch operates, the control apparatus may control the moving mechanism control apparatus to form the combined theater by moving the booth partition members, and move and remove the screen of the theater, and the control apparatus may further light a lighting apparatus and an emergency guide light. When the moving mechanism emergency stop switch operates, the moving mechanism control apparatus may prohibit the booth partition members and the screen of the theater from being moved.

In one aspect of the present invention, an attraction system comprises: a plurality of theaters arranged so as to be positioned face to face with one another; attraction picture providing means for providing an attraction picture in each of the plurality of theaters; and screen moving means for moving the screens of the plurality of theaters to cause the visitors of the plurality of theaters to meet face to face with one another. By moving the screens and combining the plurality of theaters in a state of being positioned face to face, it is possible to provide an attraction enabling the visitors of the plurality of theaters to have a feeling of unity.

The present invention is not limited to the above-described aspects of the system. The present invention may be expressed, for example, by a method for a part or all of any of the attraction systems described above, a program or a program recording medium. The advantages of the present invention can be obtained by such aspects.

For example, one aspect of the present invention is an attraction providing method. This method comprises: generating character data which is an image of a character having an image of a visitor; causing the character data to move in accordance with character scenario data which specifies at least one character's movement along an attraction story to generate an attraction picture in which the visitor acts as the character; and providing the attraction picture.

One aspect of the present invention is a program for causing a computer to generate an attraction picture. This program causes the computer to execute the processing of: acquiring character data which is an image of a character having an image of a visitor; and causing the character data to move in accordance with character scenario data which specifies at least one character's movement along an attraction story to generate an attraction picture in which the visitor acts as the character.

One aspect of the present invention is an attraction providing method, and this method comprises: changing the theater size between the size of a plurality of adjacent booths and the size of a combined theater obtained by combining the plurality of booths; and providing an attraction picture including a booth picture provided in each of the plurality of booths and a combined-theater picture provided in the combined theater. The booth picture of the booth is a picture in which one or more images of visitors seated in the corresponding booth are incorporated as characters. The theater size is changed in accordance with the progress of the attraction picture so that the theater is divided into the plurality of booths when the plurality of booth pictures are provided and the plurality of booths are combined to form the combined theater when the combined-theater picture is provided.

One aspect of the present invention is an attraction providing method, and this method comprises: partitioning a theater into a plurality of booths with the use of one or more booth partition members; and combining the plurality of booths to form a combined theater by moving the booth partition members; and when the theater is divided in the plurality of booths, each booth provides a booth picture corresponding to the booth, and, when the plurality of booths are combined, the combined theater provides a combined-theater picture. The booth picture of the booth is a picture in which one or more images of visitors seated in the corresponding booth are incorporated as characters.

One aspect of the present invention is an attraction providing method, and this method comprises: providing an attraction picture in each of a plurality of theaters arranged so as to be positioned face to face with one another; and moving screens of the plurality of theaters after providing the attraction picture, so as to make visitors of the plurality of theaters meet face to face.

As described below, other aspects of the present invention exist. Therefore, the disclosure of this invention is intended to provide a part of the aspects of the present invention and is not intended to restrict the scope of the invention described and claimed here.

BEST MODE FOR CARRYING OUT THE INVENTION

Detailed description of the present invention will be given below. However, the detailed description below and accompanying drawings do not limit the present invention. Instead, the scope of the invention is specified by accompanying CLAIMS.

In this embodiment, the image of a visitor's face is taken into an attraction picture as a visitor image. First, the configuration related to generation and provision of an attraction picture will be described. Then, an example of an attraction system suitable for a facility which seats a lot of visitors will be described.

Figure 1:
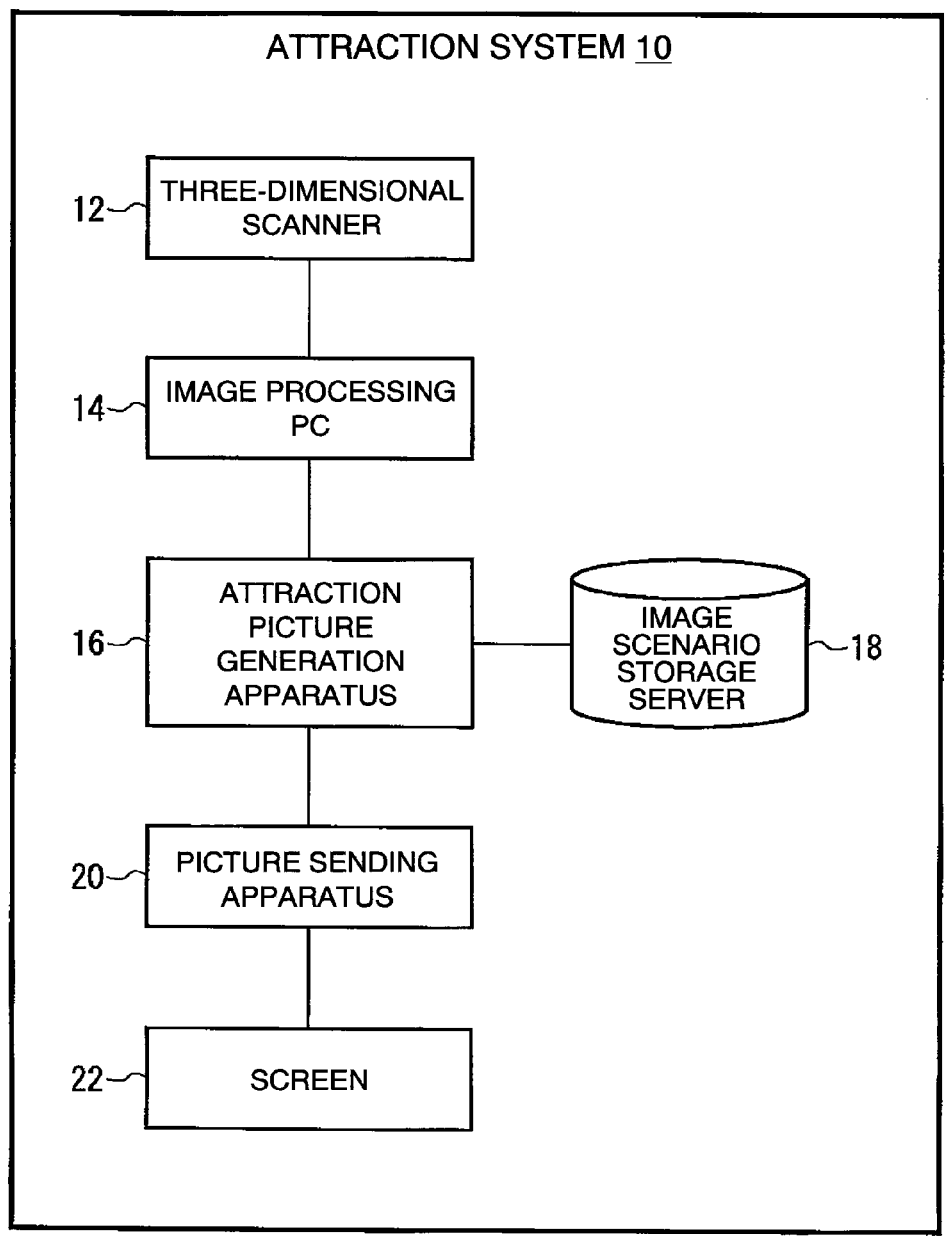
FIG. 1 is a diagram showing an attraction system of an embodiment of the present invention.

FIG. 1 shows the attraction system of this embodiment. The attraction system 10 includes a three-dimensional scanner 12, an image processing PC 14, an attraction picture generation apparatus 16, an image scenario storage server 18, a picture sending apparatus 20 and a screen 22.

The three-dimensional scanner 12 generates three-dimensional image data of a visitor. The three-dimensional scanner 12 takes images of the visitor from a plurality of directions, measures the shape of the face, and generates three-dimensional CG data from the taken images.

The image processing PC (personal computer) 14 generates character data (cast data) from the three-dimensional CG data generated by the three-dimensional scanner 12. The image processing PC 14 generates 3D CG data enabling generation of an expression, based on the data of the face shape measured by the three-dimensional scanner 12. This 3D CG data is data in which characteristic parts of the face are recognized, that is, data having information about a recognition result.

Thus, the three-dimensional scanner 12 and the image processing PC 14 function as character data generation means and generates character data which is an image of a character (cast) which has the image of a visitor.

More precisely, in this embodiment, 3D CG data of a face excluding hair and ears is taken into this system with the use of the three-dimensional scanner 12 and the image processing PC 14 to constitute character data. The outline of the face is included in the character data. That is, this system employs data excluding hair and ears. As for hair and ears, data prepared in advance is used by processing at a later stage. Of course, the image of hair and ears may be acquired from a visitor image and included in the character data, within the scope of the present invention.

A plurality of visitors are assumed in this embodiment. The three-dimensional scanner 12 and the image processing PC 14 generate character data from each of the plurality of visitors. Preferably, plurality of three-dimensional scanners 12 and image processing PCs 14 are prepared according to the number of visitors in consideration of smooth progress of an attraction.

The attraction picture generation apparatus 16 generates an attraction picture with the use of the character data and data in the image scenario storage server 18. The attraction picture generation apparatus refers to character (cast) scenario data which specifies the movements of characters along an attraction story. Then, the attraction picture generation apparatus generates an attraction picture in which the character data is moved in accordance with the attraction data. Thereby, visitors act as characters in the attraction picture.

The picture sending apparatus 20 and the screen 22 function as attraction picture providing means and provide an attraction picture generated by the attraction picture generation apparatus 16 for visitors. Typically, the screen 22 is provided in a theater, and the picture sending apparatus 20 projects an attraction picture on the screen 22.

Figure 2:
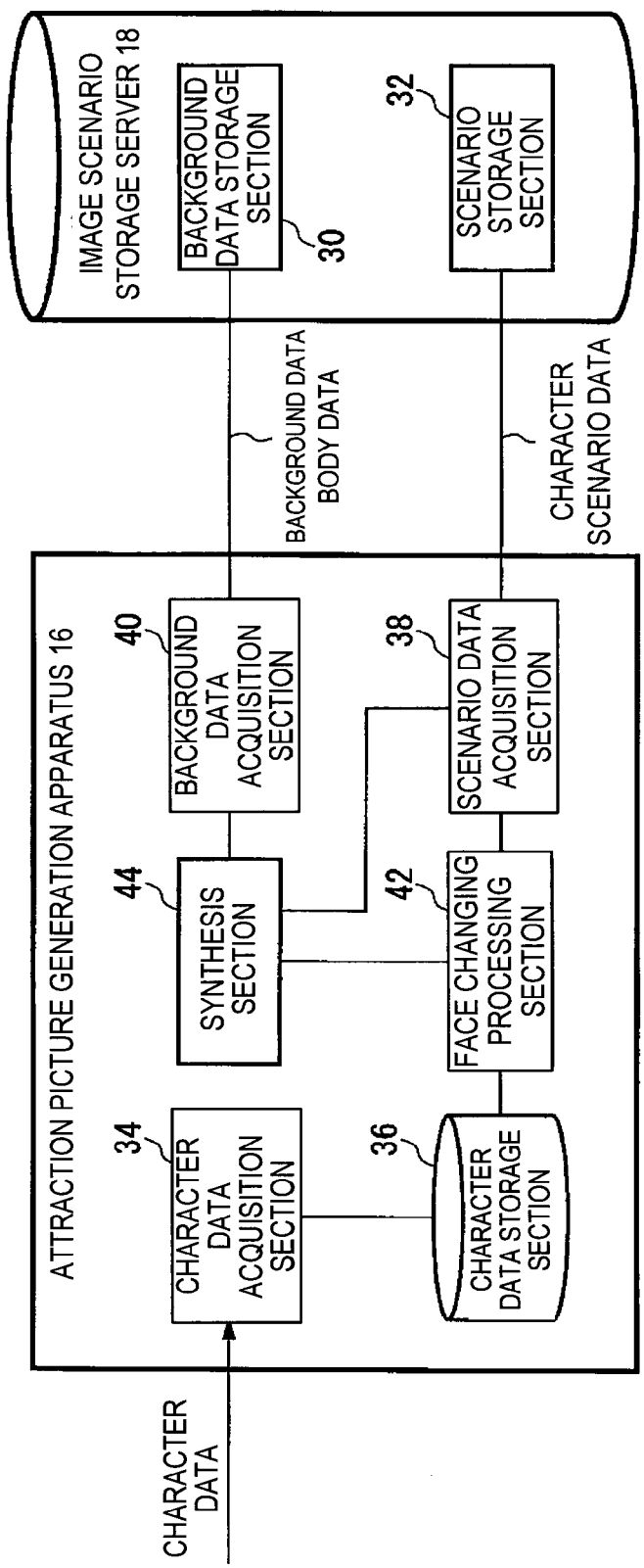
FIG. 2 is a functional block diagram of an attraction picture generation apparatus and an image scenario storage server.

FIG. 2 is a functional block diagram of the attraction picture generation apparatus 16 and the image scenario storage server 18, which are computer systems. The image scenario storage server 18 includes a background data storage section 30 and a scenario storage section 32. The attraction picture generation apparatus includes a character data acquisition section 34, a character data storage section 36, a scenario data acquisition section 38, a background data acquisition section 40, a face changing processing section 42 and a synthesis section 44.

The background data storage section 30 stores background data for an attraction picture. The background data is data of a background image. For example, if an attraction story is set in space, picture data of space, a spacecraft and the like is stored. Body data (data excluding face data) of characters is also stored in the background data storage section 30 together with the background data.

The scenario storage section 32 stores the character scenario data. The character scenario data is data which specifies the movements of characters along an attraction story as described before. In this embodiment, the character data is a character's face. The character scenario data includes data of the position, angle and expression of each character's face at each time point. The expressions are, for example, an angry face, a crying face, a smiling face, and the like. The character scenario data specifies the movements of each of multiple characters. The character scenario data may include data of conversation by the characters. Thus, the image scenario storage server 18 is a database of parts data constituting a story, such as background data, body data of the characters (images without faces) and description of a scenario, and it can be said to be a story server.

In the attraction picture generation apparatus 16, the character data acquisition section 34 acquires character data inputted from the image processing PC 14. The character data is stored in the character data storage section 36. Each of a plurality of character data is assigned to a different character. Information about this assignment is also acquired together with the character data and stored in the character data storage section 36.

The scenario data acquisition section 38 acquires character scenario data from the scenario storage section 32 of the image scenario storage server 18. The background data acquisition section 40 acquires background data and body data of characters from the background data storage section 30.

The face changing processing section 42 and the synthesis section 44 generate an attraction picture as described below. The face changing processing section 42 functions as expression changing means, and it changes the expression of character data with the use of the character data and the character scenario data. The principle of the image processing here is that the expression is changed with the use of information about face parts given to the character data by recognition processing. As described before, the character scenario data includes the expression of each character's face at each time point. Therefore, the face expression of the character data is changed by image processing in accordance with the character scenario data. Furthermore, the face changing processing section 42 may perform image processing for deforming the character's face in accordance with conversation data included in the character scenario data to generate an image of character talking.

Here, in this embodiment, the image processing is performed for face image data after recognition obtained by performing image recognition of three-dimensional CG (3D CG) data acquired by a three-dimensional scanner. The expression (including change in the face made for conversation) can be preferably changed in a picture. As the image processing for changing the expression of a face, the technique related to the HAI (Human Agent Interactive) proposed by Morishima can be preferably applied. This technique is described, for example, in "Reality and Communication Gap of Agent in HAI" by Morishima, Journal of the Japanese Society for Artificial Intelligence, Japan, The Japanese Society for Artificial Intelligence, November 2002, Vol. 17, No. 6, pp. 687-692.

The synthesis section 44 synthesizes the character data with the background data and the body data. Here, the character data in which the expression has been changed is pasted on the background. The character scenario data includes the position and the angle of each character data at each time point as described before. The character data is pasted in accordance with the position and the angle in the character scenario data. The body data of the character is also pasted on the background data. Moving (time-varying) image data of a body may be prepared in advance. It is also possible to move the body by CG processing in accordance with the scenario data when synthesis is performed.

As described above, the attraction picture generation apparatus 16 generates an attraction picture in which the images of visitors act changing their expressions. In the attraction picture, the characters, who are visitors, perform the same movements as the behaviors of living persons, such as "talking", "showing expressions of human feelings" and "performing physical movements such as moving hands or moving legs".

Next, the operation of the attraction system 10 of this embodiment will be described. When a visitor visits a facility provided with the attraction system 10, he/she is scanned by the three-dimensional scanner 12. The three-dimensional scanner 12 measures the shape of the visitor's face. The image processing PC 14 generates 3D CG data capable of generating expressions, based on the face shape data measured by the three-dimensional scanner 12.

The attraction picture generation apparatus 16 generates an attraction picture from data in the image scenario storage server 18 and character data. The expressions of the character data is changed by image processing in accordance with character scenario data. Then, the character data is synthesized with background data at the position and angle specified in the character scenario data. Body data is also synthesized with the background data.

The attraction picture is handed over from the attraction picture generation apparatus 16 to the picture sending apparatus 20. The picture sending apparatus 20 projects the attraction picture on the screen 22. The visitor sits on a seat in the theater and appreciates the CG picture in which he/she appears, on the screen 22.

In the above process, scanning of the visitor and generation of the character data may be performed while the visitor is waiting for the attraction to start. Generation of the attraction picture may be performed in real time along the progress of the attraction show. That is, generation and output of the attraction picture may be simultaneously performed in parallel during the show.

As described above, according to the present invention, it is possible to cause the image of a visitor to appear in an attraction picture, and it is further possible to cause the image of the visitor to act. Thereby, the visitor's feeling as if he/she were in the picture can be drastically increased.

Variations of the above embodiment will be described. The character data may include not only face data of a character but also body data. That is, though the body data is processed together with the background data in the above embodiment, the body data may be processed together with the face data. The body data may be data prepared in advance or data of the image of a visitor.

Character data of a plurality of expressions may be prepared at the stage of generating the character data. Then, at the stage of synthesis with a background, character data of an expression specified at each time point may be selected.

Furthermore, as for the processing for generating an expression, the attraction system of this embodiment may be configured as described below. The configuration below is desirable to preferably realize real-time rendering. In this configuration, the image processing PC 14 generates "standard model data" and "a set of a plurality of kinds of sample expression data" as the character data of each visitor. The standard model data is a 3D CG image of a standard expression for which texture mapping has been performed. Typically, the standard model data is data of an expressionless face. The standard model data is also referred to as fitting data. The sample expression data is data which specifies the shape of a face, and it is, for example, wireframe data. The sample expression data becomes a part of the character data. For example, thirty-two sample expression data are generated.

As the expression data of the character scenario data, blend data of the sample expression data is stored. The blend data specifies the kind of sample expression data to be selected. The face expression changing section 42 selects one or more sample expression data shown in the blend data. When one sample expression data is specified and selected, the standard model data is deformed with the use of the sample expression data. When a plurality of sample expression data are selected, the standard model data is deformed with the use of those sample expression data. The standard model data is deformed into a shape in which the plurality of sample expression data are mixed. A face CG image at each time point is generated in accordance with the blend data at each point. This face CG image is synthesized with a background image as the character data after the expression has been changed.

The blend data may include the blend ratio. In this case, weight is given in accordance with the ratio.

The expression (blend) data does not have to be set for all frames. The expression data may be set at predetermined intervals. In short, the expression data may be set for one frame per a predetermined number of frames. In this case, the expression changing section 42 generates a face CG image for the frame for which the expression data is set. The face CG images for the remaining frames may be generated by interpolation processing. The face CG images for the remaining frames may be generated by morphing processing.

All the visitors do not have to appear in an attraction picture, within the scope of the present invention. Only those wishing to appear may appear in the attraction picture. Default images may be applied to the remaining characters.

The attraction story does not have to be fixed, within the scope of the present invention. It is possible to compose a story interactively and cause a character to take a different action in response to a visitor's instruction. In this case, it is preferable to provide an instruction input apparatus on visitors' seats to accept a visitor's instruction.

The attraction picture generation apparatus 16 of this embodiment may be configured by a plurality of computers which share image generation. For example, in the case of thirty computers sharing images of 30 frames per second, each computer generates an image of one frame per second. One image is generated by a certain computer, and the next image is generated by another computer. The next to next image is generated by a still another computer, and the thirty-first image is generated by the first computer.

Each computer stores the background data, body data and character scenario data of the image to be generated by the computer. Therefore, the image scenario storage server does not have to be used. Each computer performs the face deformation processing of character data described above with the use of these data, and generates an image of one frame by synthesizing the character data, the background data and the body data.

The images which are sequentially generated by the computers are collected to a computer for arraying (editing). Then, by the arraying computer arranging the images in a predetermined order, a moving image is generated. The arraying computer is connected to the plurality of image generation computers so that image communication can be performed. A part of the image generation computers may be the arraying computer.

Such a configuration is especially advantageous in the following points.

In this embodiment, the background data and the body data are prepared in advance, that is, they are pre-rendering data. On the other hand, a character's face is data generated in real time from the character data by face deformation, that is, it is real-time rendering data. In this embodiment, a picture is generated by synthesizing the real-time rendering data and the pre-rendering data.

Here, the pre-rendering data progresses in accordance with the frame rate of the attraction picture without getting slow. In the above example, the rate of 30 frames per second is kept. If the processing of real-time rendering is delayed, the real-time rendering cannot catch up with the progress of the pre-rendering data, and the attraction picture cannot be generated successfully.

According to the present invention, such a situation can be avoided by processing being shared by a plurality of computers. The time required for generation processing of an image of one frame in each computer may be longer than the time for one frame of an attraction picture. By providing the number of computers depending on the processing performance of the computers, the real-time rendering processing performance enough to prevent the real-time rendering from falling behind the pre-rendering data can be ensured. By preparing an appropriate number of computers, even a system configured by personal computers can generate the real-time rendering data at a speed which prevents the real-time rendering data from falling behind the pre-rendering data.

As described above, the attraction picture generation means is preferably configured by a plurality of image generation computers, and each of the plurality of image generation computers has a function of generating frame images constituting an attraction picture which is a moving image. Each frame image of a group of frame images of the attraction picture is assigned to any of the plurality of image generation computers. Here, the frame images arrayed in order are sequentially assigned to different image generation computers to be processed. Each image generation computer generates the assigned frame image. Furthermore, an arraying computer is provided, and the arraying computer arranges the group of frame images generated by these image generation computers in the order set and stored in advance along the progress of the attraction picture. Due to such a configuration as described above, it is possible to appropriately generate time-varying image data in which the pre-rendering data and the real-time rendering data are synthesized.

Next, an attraction system suitable for a facility which seats a lot of visitors will be described. As for a picture-providing-type attraction, the number of visitors to one show is relatively large. However, the time for one show is restricted. It is supposedly assumed that, simply a lot of visitors appear in a picture. In this case, the time of the performance of each visitor is shortened, or the size of each visitor is reduced.

For example, it is supposedly assumed that there are two hundred and forty visitors, and the time of the show is about twelve minutes. In this case, if there are as many as two hundred and forty characters, it is thought to be difficult for each character to sufficiently appear.

The present invention can solve the above problem as shown in the embodiment below. The example described above will be also used in the description below. That is, it is supposedly assumed that there are two hundred and forty visitors, and the time of the show is about twelve minutes.

Figure 3:
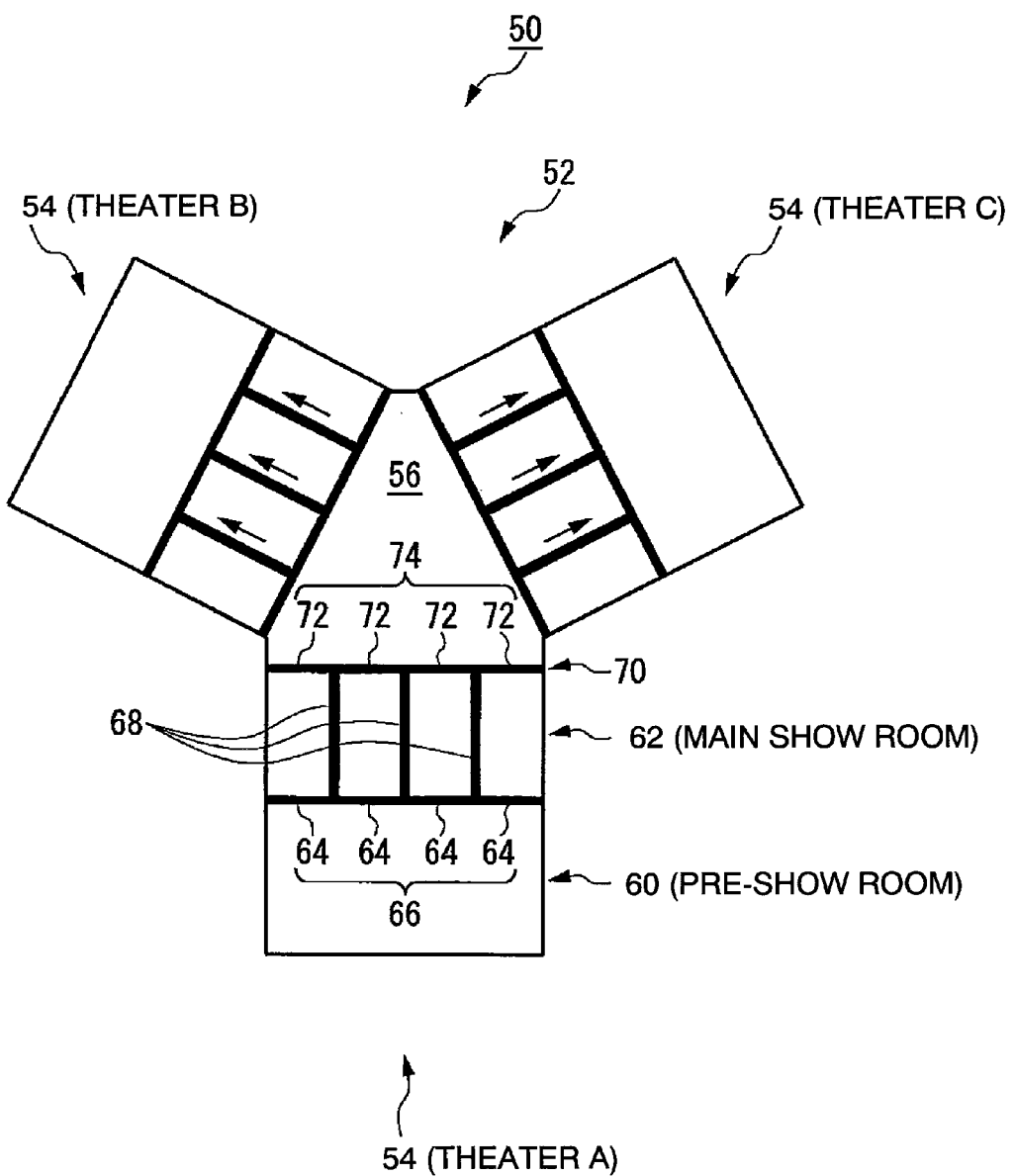
FIG. 3 is a plane view of a facility for the attraction system.

FIG. 3 is a simplified plane view of the facility of an attraction system 50.

As shown in FIG. 3, an attraction facility 52 has three theaters 54 (theaters A, B and C). Each theater 54 seats eighty visitors, and the total of two hundred and forty visitors can be seated.

The three theaters 54 are arranged so that they are positioned face to face with one another. At the center of the three theaters 54, there is arranged a central area 56.

Each theater 54 is configured by a pre-show room 60 and a main show room 62. The pre-show room 60 is arranged at the outer side, and the main show room 62 is arranged at the inner side.

The pre-show room 60 is a room where visitors wait for a main show to begin. The visitors receive explanation about the show by a picture and voice in the pre-show room 60.

The main show room 62 is a room where an attraction picture, which is the main show, is shown. The main show room 62 is configured by four booths 64. These booths 64 are combined to form a combined theater 66. Each booth seats twenty visitors. Since the booth 64 is formed by dividing the theater 54 (or the combined theater 66), it may be referred to as a divided theater.

As shown in the figure, the four booths 64 are arranged side by side, and they are partitioned by three movable booth partition walls 68. The booth partition walls 68 are moved backward, that is, toward the outer side (toward the pre-show room 60) by a partition wall moving apparatus. Thereby, the booth partition walls 68 are removed, and the divided theaters 64 are combined to form the combined theater 66. The booth partition wall may be a hard member or a soft member. For example, the booth partition wall 68 may be a curtain.

A screen 70 of the theater 54 is configured by four divided screens 72. The divided screen 72 is a screen of the booth 64, and it has a size according to the width of the booth 64.

When the booth partition walls 68 are removed, a combined screen 74 is formed by the four divided screens 72. The combined screen 74 is the screen of the combined theater 66. It does not matter even if there is a gap between adjacent divided screens 72 and the combined screen 74 is not completely continuous.

In this embodiment, the screen 70 is also movably provided as described later. The screen 70 is removed by being moved downward by a screen moving apparatus. The combined screen 74 may move, and each of the divided screens 72 may individually move. Furthermore, a ceiling not shown is also movably configured. The ceiling is moved backward by a ceiling moving apparatus.

Figure 4:
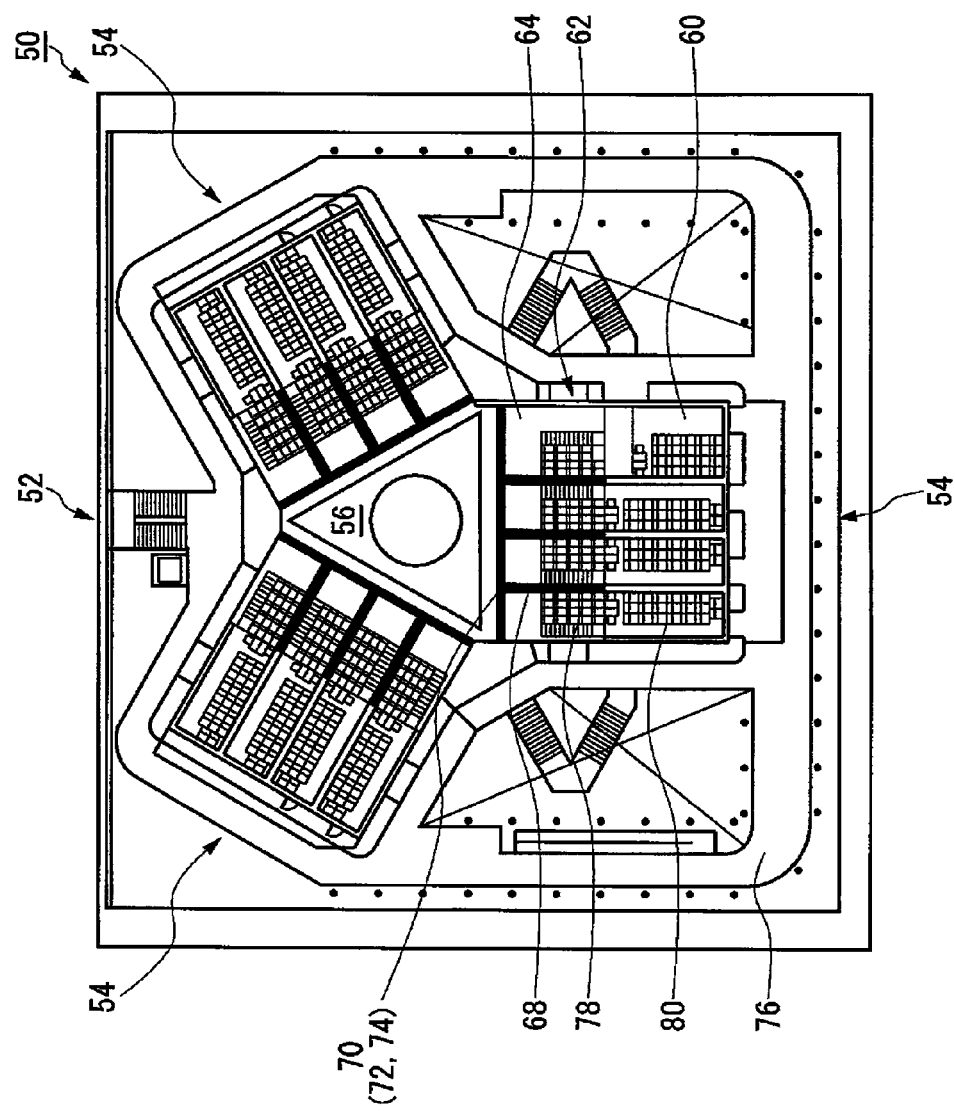
FIG. 4 is a plane view of the attraction system, and it is a diagram showing a twenty-visitor theater.
Figure 5:
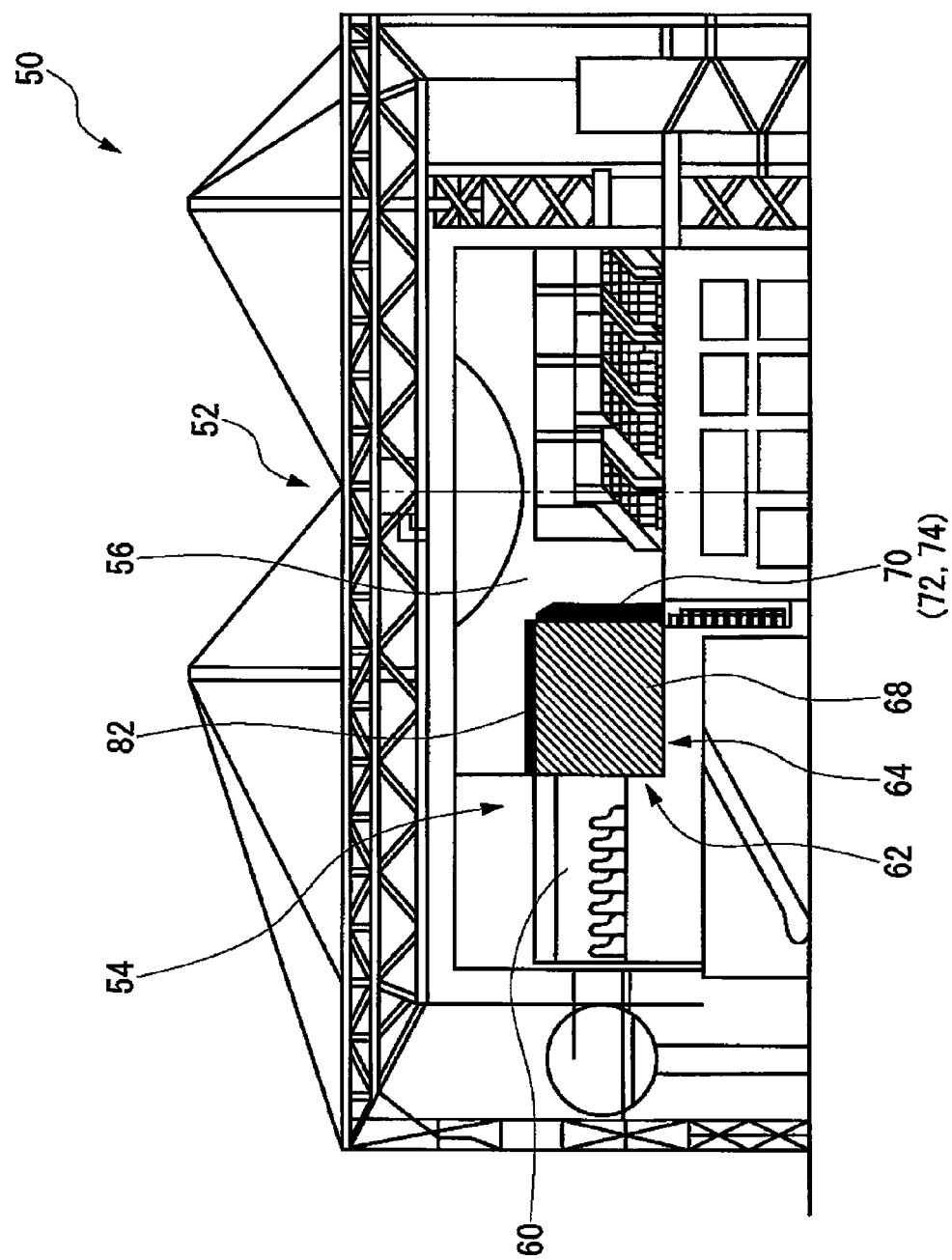
FIG. 5 is a sectional view of the attraction system seen from a horizontal direction, and it is a diagram showing the twenty-visitor theater.
Figure 6:
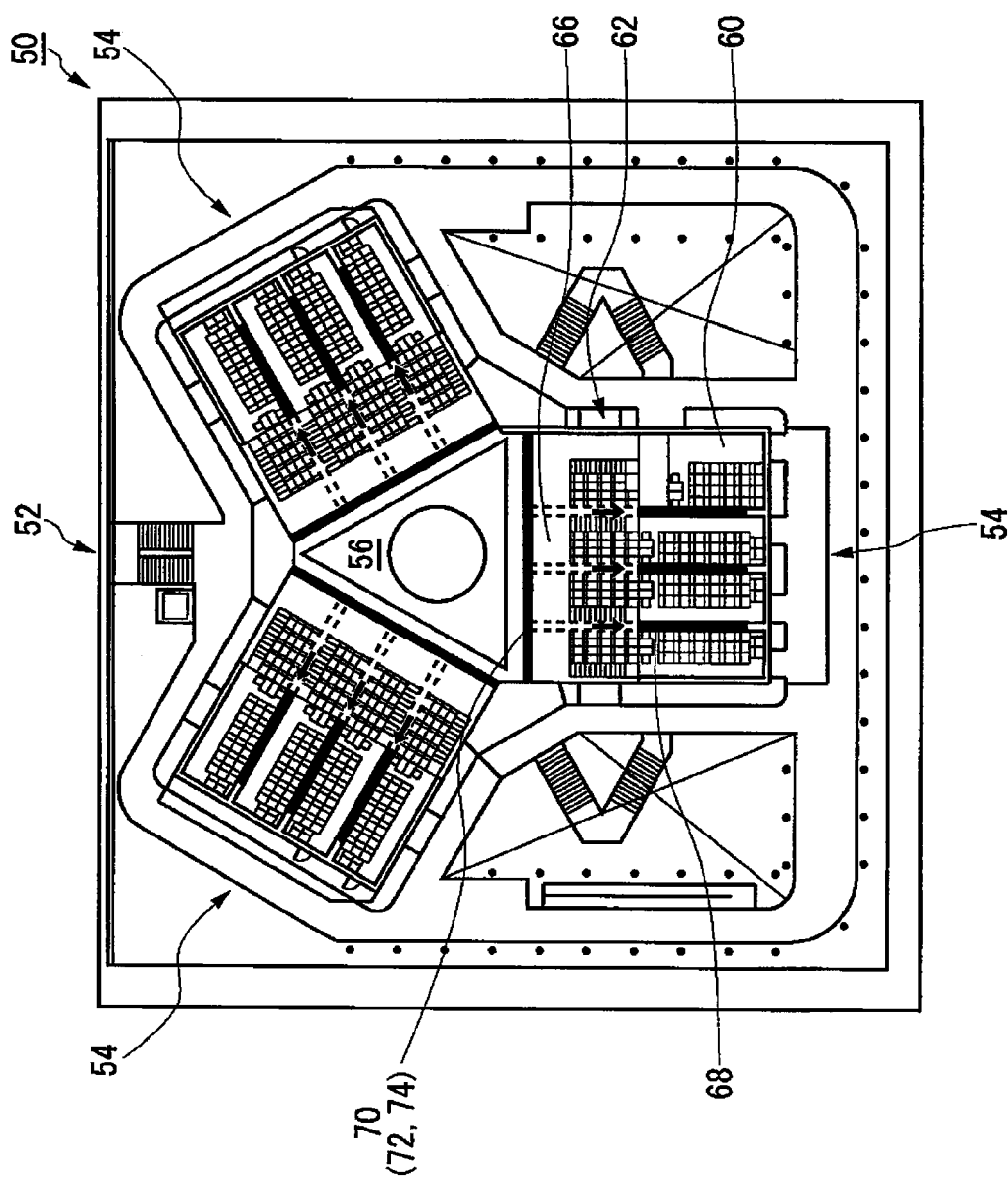
FIG. 6 is a plane view of the attraction system, and it is a diagram showing an eighty-visitor theater.
Figure 7:
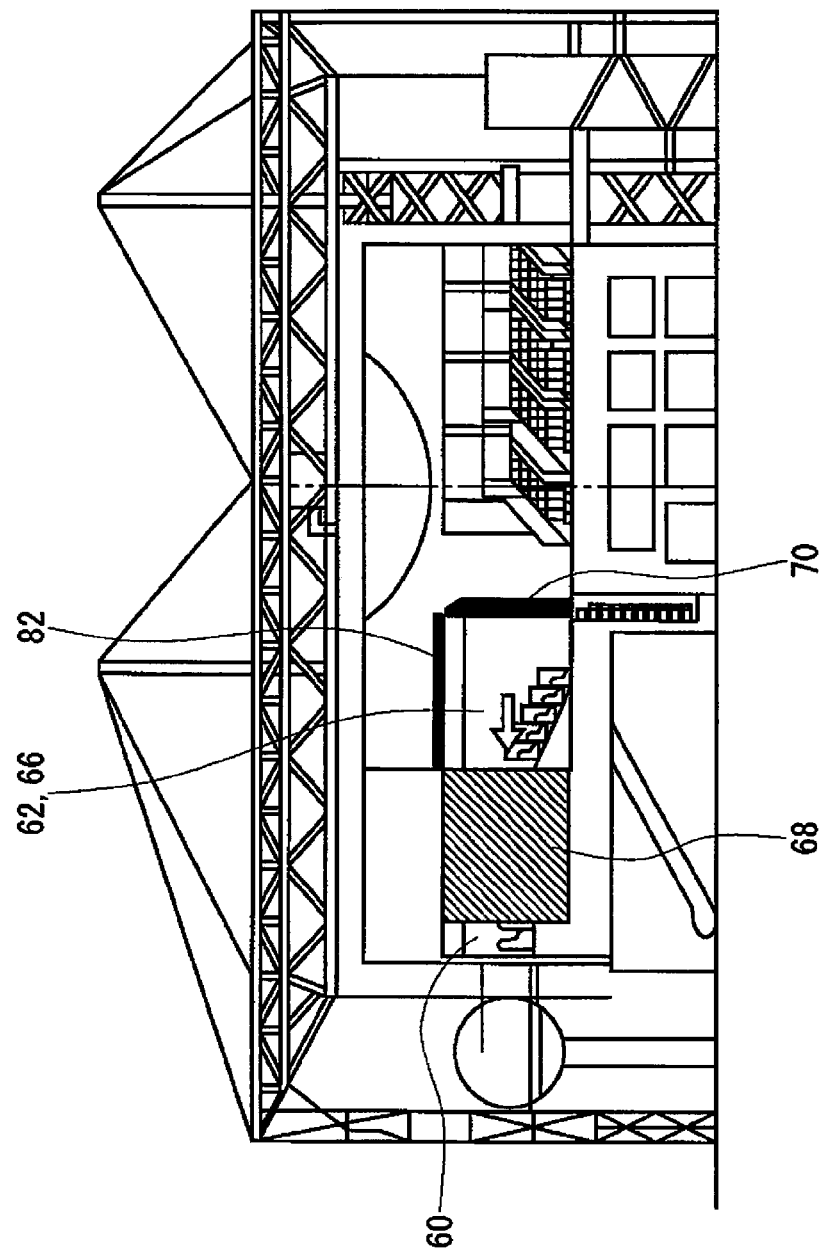
FIG. 7 is a sectional view of the attraction system seen from a horizontal direction, and it is a diagram showing the eighty-visitor theater.
Figure 8:
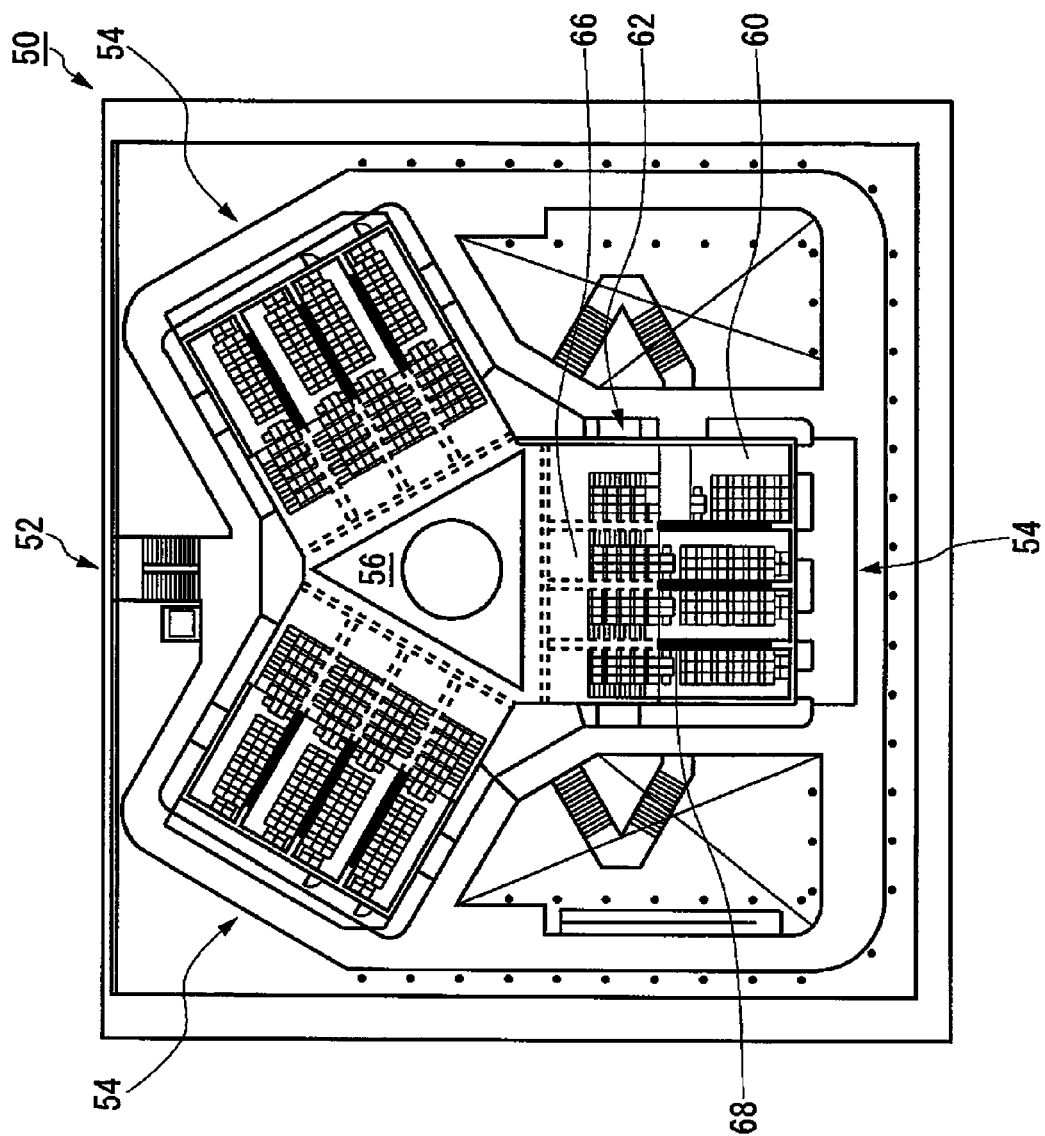
FIG. 8 is a plane view of the attraction system, and it is a diagram showing a two-hundred-and-forty-visitor theater.
Figure 9:
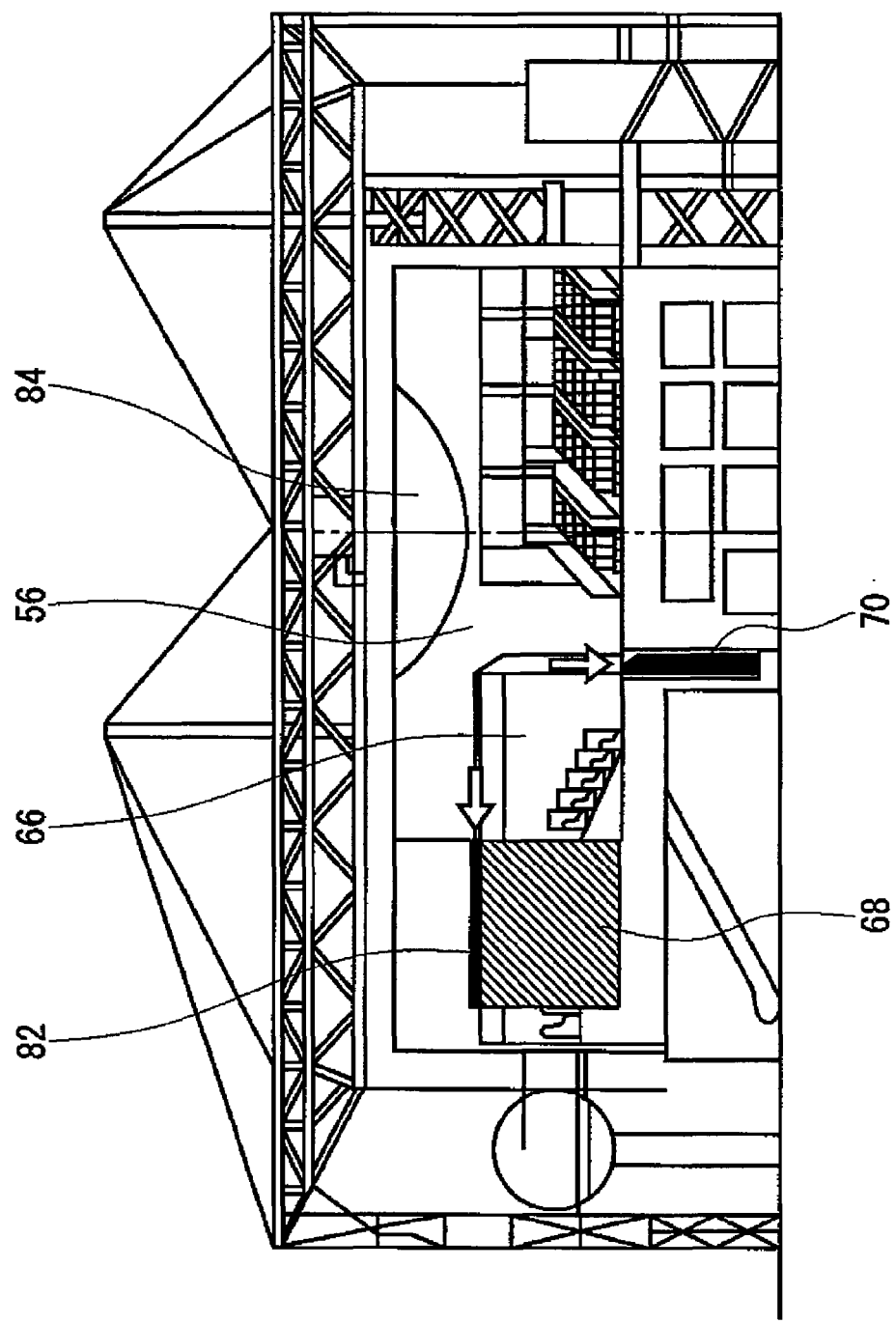
FIG. 9 is a sectional view of the attraction system seen from a horizontal direction, and it is a diagram showing the two-hundred-and-forty-visitor theater.

FIGS. 4 to 9 are more detailed drawings of the attraction facility 52. FIGS. 4, 6 and 8 are plane views, and FIGS. 5, 7 and 9 are sectional views when the attraction facility 52 is seen from a horizontal direction.

FIGS. 4 and 5 show the state that the booth partition walls 68 and the screen 70 are in the main show room 62. FIGS. 6 and 7 show the state that the booth partition walls 68 have been moved from the state in FIGS. 4 and 5, respectively. FIGS. 8 and 9 show the state that the screen 70 has further been moved.

As shown in FIGS. 4 and 5, there is provided a path 76 for visitors to walk on, around the three theaters 54. Twenty main show seats 78 are installed in each booth 64. The pre-show room 60 is provided with twenty pre-show seats 80 at the position corresponding to each booth 64, and the total of eighty pre-show seats 80 are provided.

As shown in FIGS. 6 and 7, the booth partition walls 68 are moved backward and enter the pre-show room 60, and, thereby, they are removed from the main show room 62. The partition wall moving apparatus (actuator) has a guide mechanism (path), a motor, and a mechanism for transmitting the power of the motor to move the booth partition walls 68 along the guide.

As shown in FIGS. 8 and 9, the screen 70 descends toward the groove at the lower side, and it is stored under the floor and removed from the visitors' sight. The screen moving apparatus (actuator) has a guide mechanism (path), a motor, and a mechanism for transmitting the power of the motor to move the screen 70 along the guide, similar to the booth partition wall moving apparatus.

The attraction facility 52 is provided with a ceiling moving apparatus for moving a ceiling 82 of the theater 54. The ceiling moving apparatus slidingly moves the ceiling 82 backward. The ceiling moving apparatus (actuator) also has a guide mechanism (path), a motor, and a mechanism for transmitting the power of the motor to move the ceiling 82 along the guide.

When the screen moving apparatus moves the screen 70, the ceiling moving apparatus moves the ceiling 82. Thereby, the three theaters 54 are further combined. The visitors of the three theaters 54 meet face to face, and the ceiling of the central area 56 enters the visitors' field of vision. A central common object 84 is installed above the center of the central area 56 so that it can be seen from all the visitors in that state.

Among FIGS. 4 to 9 described above, FIGS. 4 and 5 show a twenty-visitor theater configured by the booth 64. FIGS. 6 and 7 show an eighty-visitor theater configured by the combined theater 66. FIGS. 8 and 9 show a two-hundred-and-forty-visitor theater configured by the three combined theaters 66.

Figure 10:
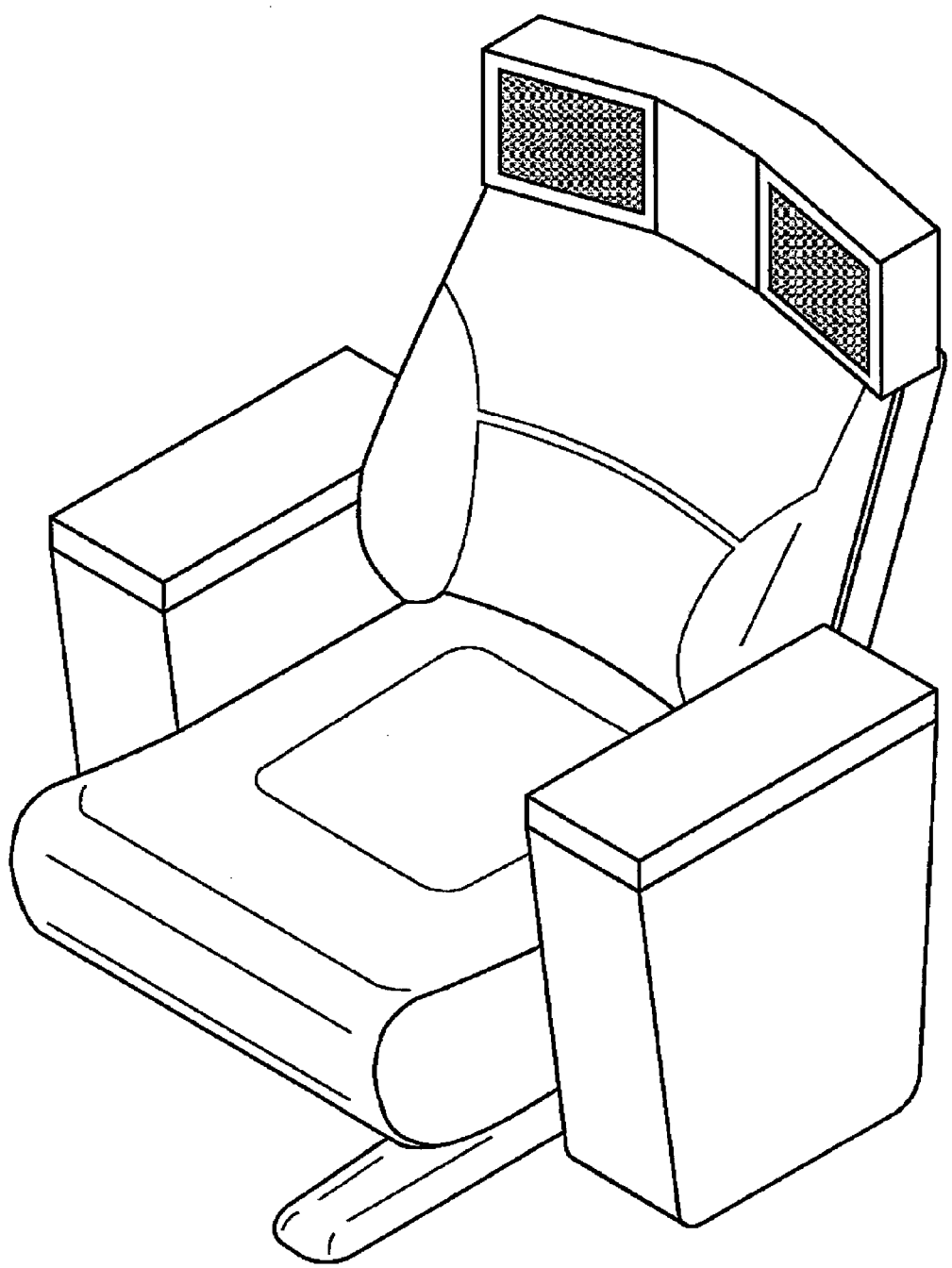
FIG. 10 shows a main show seat in a main show room.

FIG. 10 shows a main show seat 78 in the main show room 62. As shown in the figure, the upper parts of the back portion project to be close to the ears of a visitor. Speakers with high directivity are installed at these positions. The advantages shown below can be obtained due to this configuration.

In this embodiment, the booth partition walls 68 are provided as described above. When the booth partition walls 68 are moved, noises occur. According to the present invention, the influence of the noises can be suppressed even if the booth partition walls 68 are moved during projection of an attraction picture. That is, even if the noises occur, the voice of the attraction picture can be transmitted to visitors with a sufficient quality. Therefore, it is possible to preferably realize a system for moving the booth partition walls 68 during projection of an attraction picture.

Figure 11:
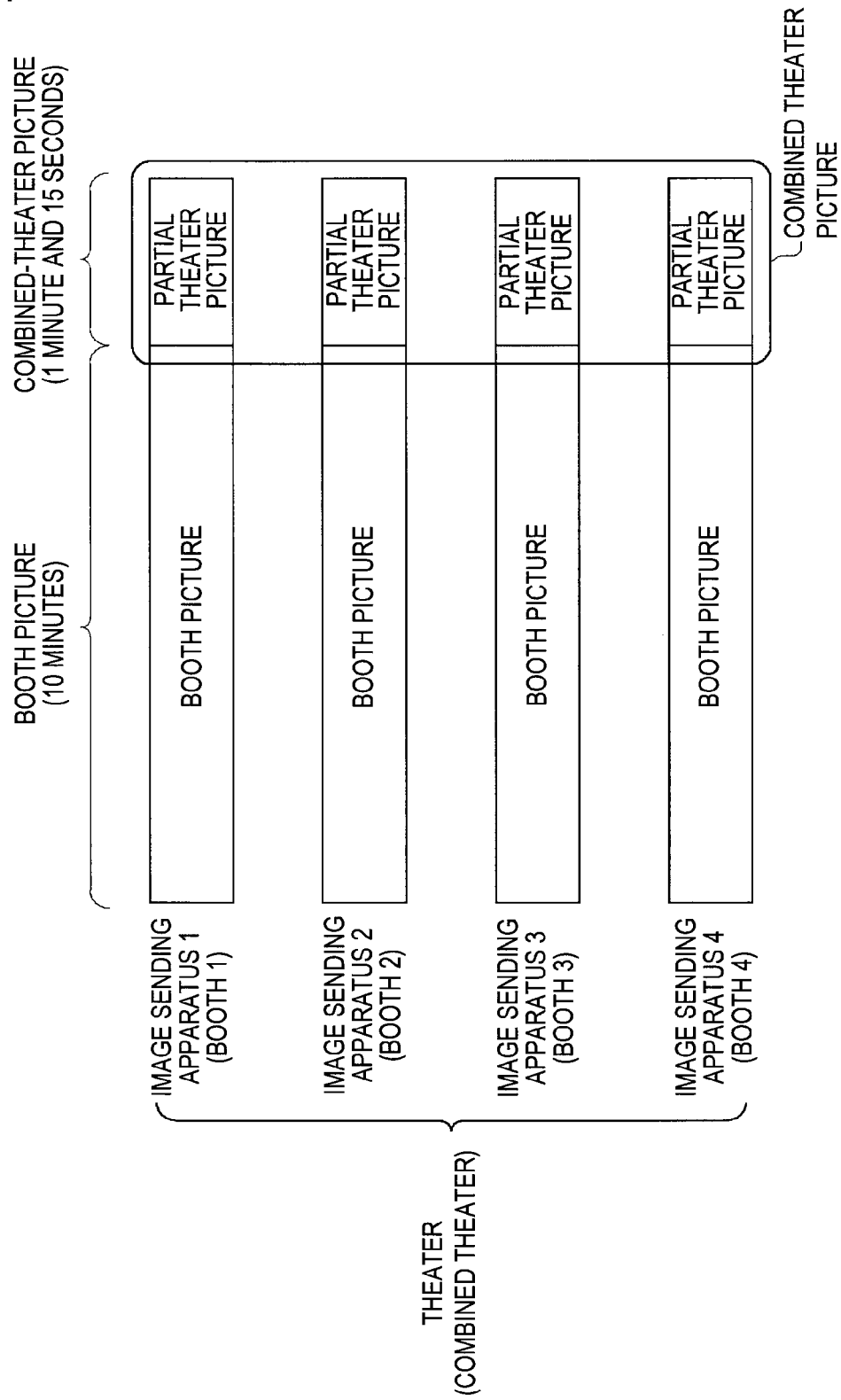
FIG. 11 shows an example of an attraction picture provided in this embodiment.

FIG. 11 shows an example of the attraction picture provided by this embodiment. FIG. 11 indicates four pictures provided by four picture sending apparatuses provided in the four booths, respectively.

The attraction picture is configured by a ten-minute booth picture (divided-theater picture) and a one-minute-and-fifteen-second combined-theater picture. The booth picture is a picture to be provided in the booth, and the combined-theater picture is a picture to be provided in the combined theater.

The booth picture is generated with the use of the system in FIG. 1. Thereby, each booth picture becomes a picture in which the images of the visitors seated in a corresponding booth are incorporated as characters. Therefore, among the four pictures in FIG. 11, the characters in the booth picture part differ.

The combined-theater picture is provided with the use of the combined screen. The combined-theater picture is a picture with a size corresponding to the combined screen. As the combined-theater picture, a large-scaled picture suitable for the large-sized screen is appropriate.

As described above, the combined-theater picture is provided with the use of the four picture sending apparatuses 1 to 4. Each of the picture sending apparatuses 1 to 4 in FIG. 11 provides a partial theater picture as the combined-theater picture. The partial theater picture is a picture corresponding to a quarter of the whole picture. By being combined with one another, the adjacent four partial theater pictures form the combined-theater picture. In this example, one picture sending apparatus provides an attraction picture which includes a booth picture and a partial theater picture. Such an attraction picture is included in the attraction picture which includes the booth picture and the combined-theater picture in the present invention. In this embodiment, the four picture sending apparatuses 1 to 4 provide a combined-theater picture in cooperation with one another. In this case, four pictures are provided in synchronization with one another, and, thereby, visitors can see a full-size combined-theater picture.

Visitors may also appear as characters in the combined-theater picture. In this case also, character data created from the visitors is incorporated in the combined-theater picture with the use of the system in FIG. 1. All the visitors in the combined theater may appear, or a part of them may appear.

Figure 12:
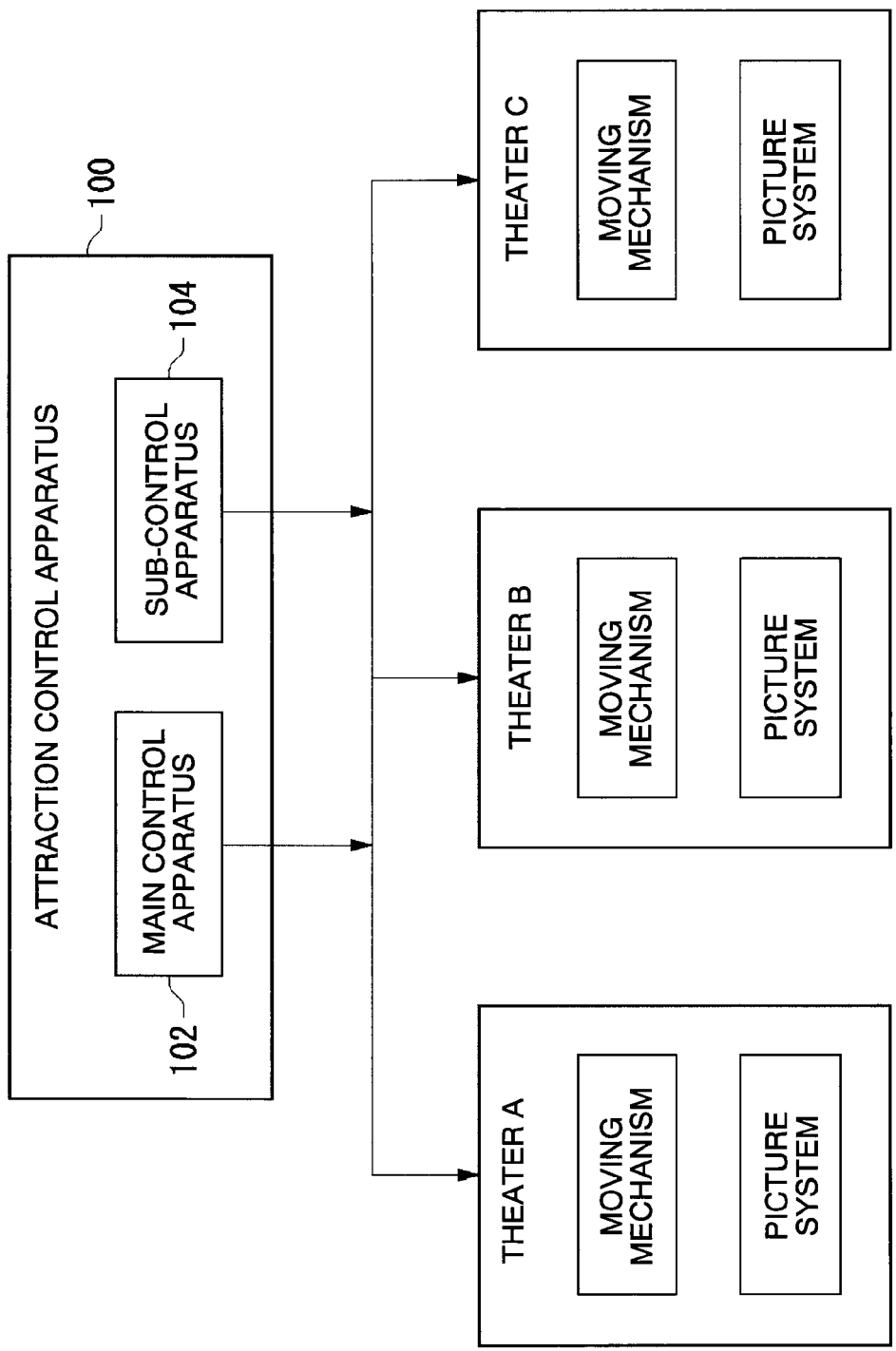
FIG. 12 is a block diagram showing the configuration related to control of the attraction system.
Figure 13:
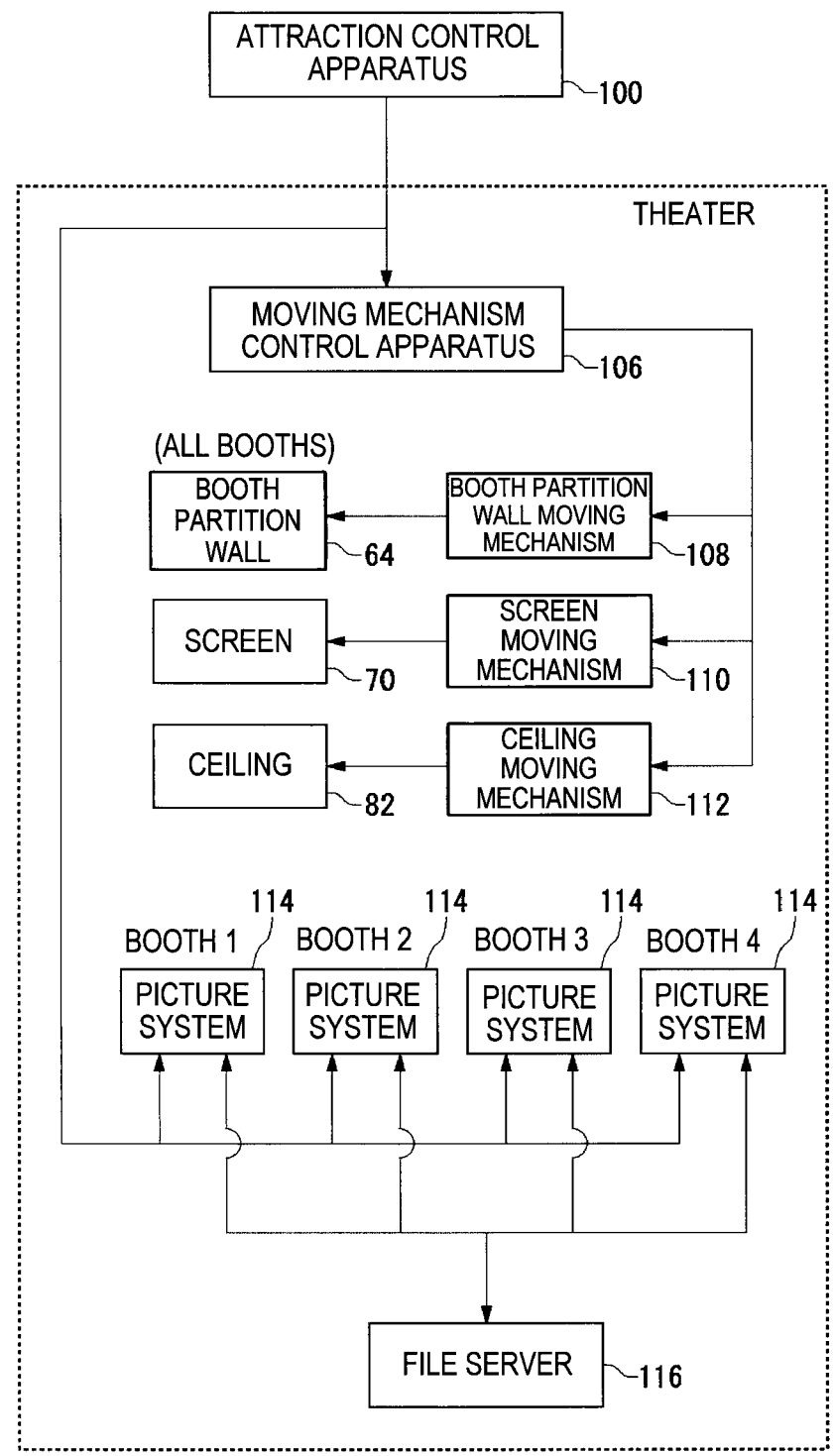
FIG. 13 is a block diagram showing the configuration of one theater.

Next, FIGS. 12 and 13 are block diagrams showing the configuration related to control of the attraction system 50.

In FIG. 12, an attraction control apparatus 100 is a computer system for controlling the whole attraction system 50. The attraction control apparatus 100 is provided with two system configurations of a main control apparatus 102 and a sub-control apparatus 104. Usually, the main control apparatus 102 is used. In the case of occurrence of any fault in the main control apparatus 102, the control system is switched to the sub-control apparatus 104, and the sub-control apparatus 104 is used.

The attraction control apparatus 100 controls the moving mechanisms and the picture systems of the three theaters A, B and C. The three theaters A, B and C are arranged in parallel. The attraction control apparatus 100 can control the three theaters A, B and C independently from one another. The voice systems of the theaters A, B and C are also arranged in parallel, though it is not shown, and the attraction control apparatus 100 can also control the voices of the three theaters A, B and C independently from one another.

In addition to the control of the whole system, the attraction control apparatus 100 also monitors the progress condition of the attraction of each theater and each booth, the operation condition of each apparatus, the state of the network and the like. The network connects apparatuses, such as computers, constituting the system to one another. In the case where an error is found in any of the various apparatuses, the attraction control apparatus 100 displays the condition of the error on the operation screen and inputs an operation instruction by an operator.

FIG. 13 is a block diagram showing the configuration of one theater. In this embodiment, each theater is provided with a moving mechanism control apparatus 106. The moving mechanism control apparatus is connected to the attraction control apparatus 100 and is controlled by the attraction control apparatus 100.

The moving mechanism control apparatus 106 functions as a partition wall movement control section, a screen movement control section and a ceiling movement control section. The moving mechanism control apparatus 106 controls the movement of the booth partition walls 68 among the booths by controlling a booth partition wall moving mechanism (moving apparatus) 108. Furthermore, the moving mechanism control apparatus 106 controls the movement of the screen 70 by controlling a screen moving mechanism (moving apparatus) 110. Furthermore, the moving mechanism control apparatus 106 controls the movement of the theater ceiling 82 by controlling a ceiling moving mechanism (moving apparatus) 112. Each of these moving mechanisms 108, 110 and 112 is configured by a motor and the like.

Each theater is provided with four picture systems corresponding to the four booths. The four picture systems 114 are arranged in parallel. The four picture systems 114 are connected to a common file server 116.

Each of the picture systems 114 is also controlled by the attraction control apparatus 100. Therefore, the attraction control apparatus 100 controls provision of a picture in each of the four booths of each theater independently. Furthermore, the attraction control apparatus 100 can also control provision of voices in each booth independently though it is not shown.

Figure 14:
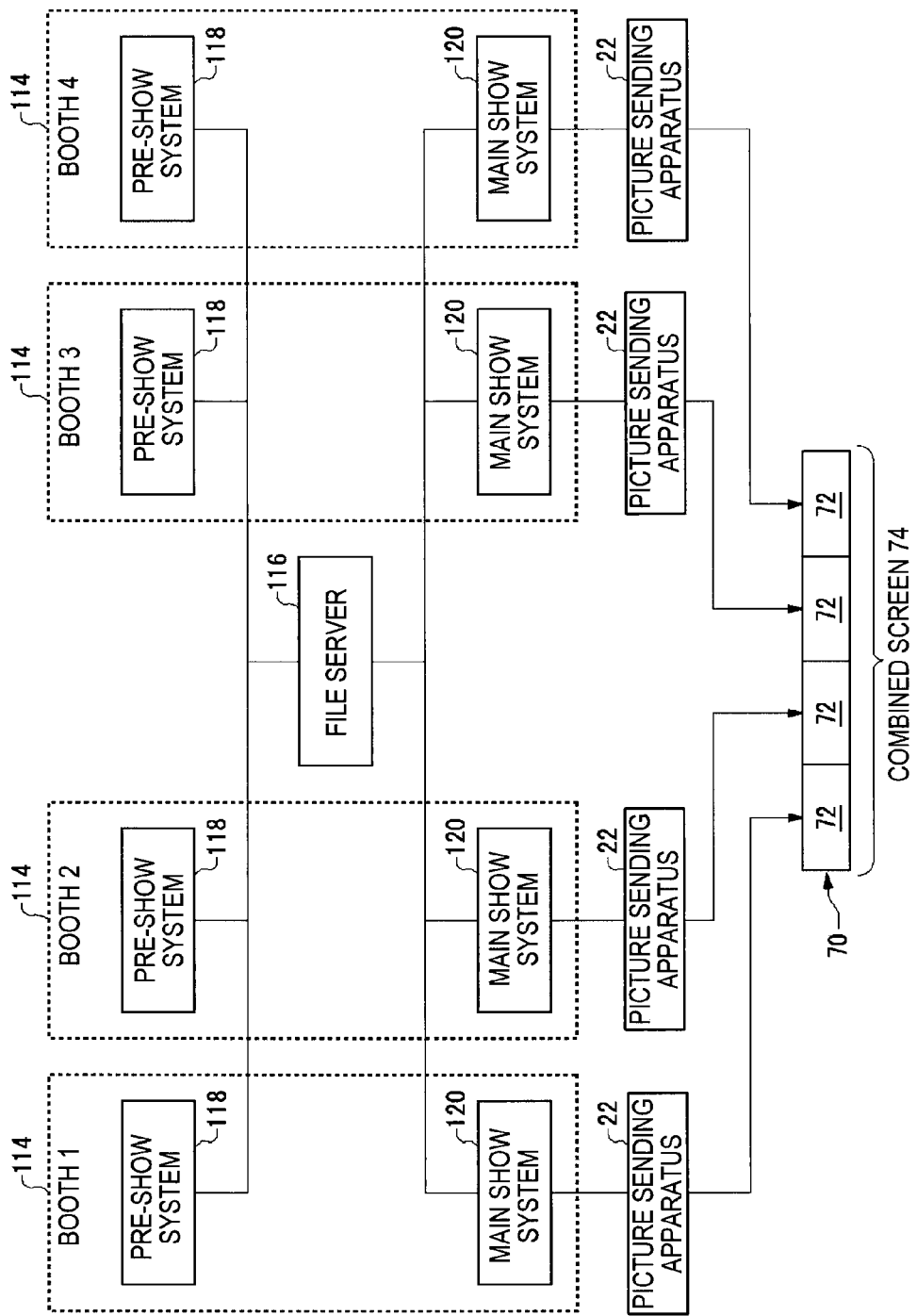
FIG. 14 is a block diagram showing picture providing systems of four booths in one theater.

FIG. 14 shows the picture-related configuration of each theater. Each theater is provided with four parallel picture systems 114 corresponding to the four booths. Each picture system 114 is configured by a pre-show system 118 and a main show system 120. The pre-show system 118 generates character data, which is a CG image of a visitor's face, and stores it in the file server 116. The main show system 120 uses character data for a corresponding booth to generate an attraction picture. The attraction picture is sent out from the picture sending apparatus 22 and displayed on the screen 72. Each of the four picture sending apparatuses 22 sends out its attraction picture to its screen 72.

Figure 15:
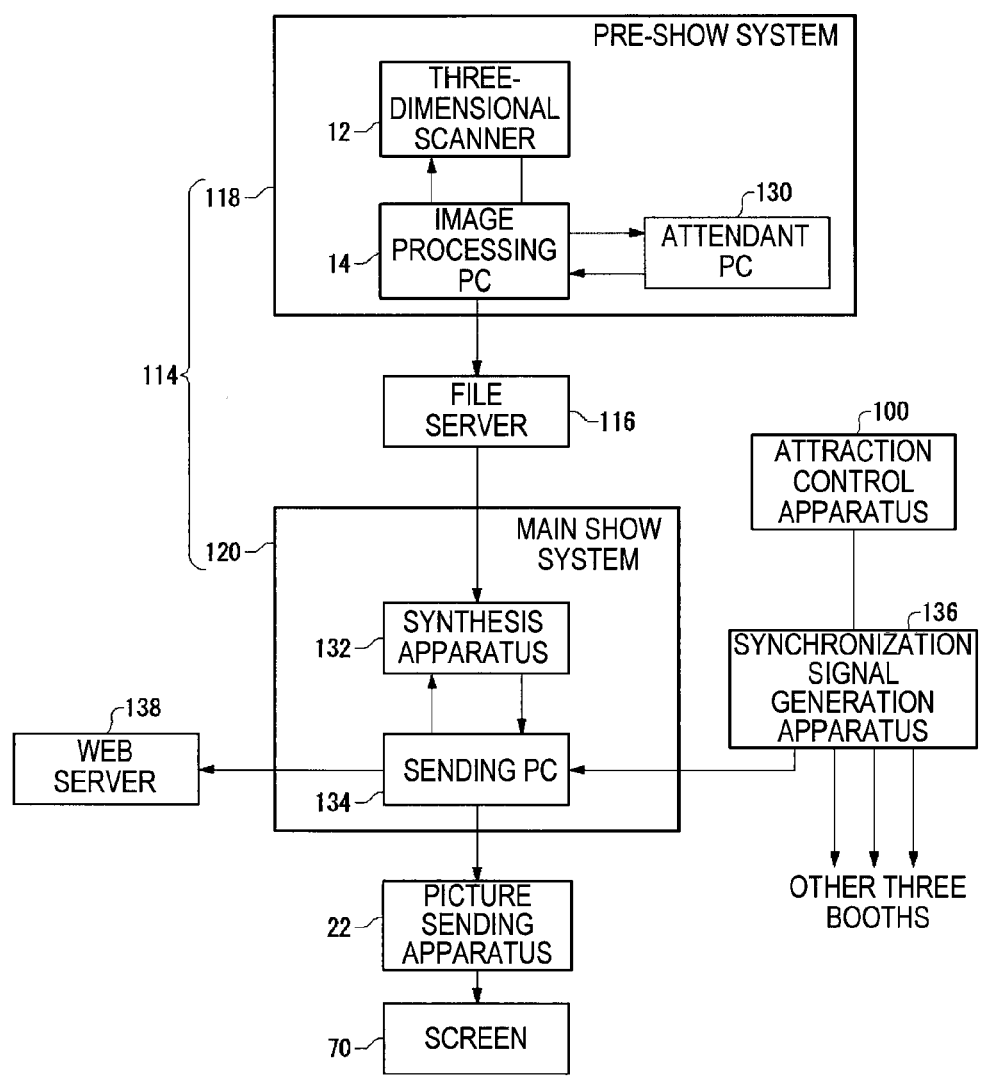
FIG. 15 is a block diagram showing the picture providing system of one booth.

FIG. 15 shows the picture system of each booth. The pre-show system 118 is configured by a three-dimensional scanner 12, an image processing PC 14 and an attendant PC (personal computer) 130. The three-dimensional scanner 12 and the image processing PC 14 are configured as described with the use of FIG. 1. The three-dimensional scanner 12 generates three-dimensional CG data of a visitor, and the image processing PC 14 generates character data from the three-dimensional CG data.

The attendant PC 130 controls the three-dimensional scanner 12 and the image processing PC 14. Control data is sent from the attendant PC 130 to the image processing PC 14, and the control data is further sent from the image processing PC 14 to the three-dimensional scanner 12. The attendant PC 130 is operated by an attendant (an operator of an attraction provider).

In a pre-show, the attendant operates the attendant PC 130 to instruct image-taking timing, image judgment and image processing. Specifically, the image of a visitor is taken by the three-dimensional scanner 12 in response to an operation by the attendant. The three-dimensional scanner 12 outputs three-dimensional CG data to the image processing PC 14. The image processing PC 14 outputs thumbnail image data of the visitor to the attendant PC 130. Then, a thumbnail image of the visitor is displayed on the operation screen of the attendant PC 130.

The attendant looks at the thumbnail image on the operation screen and performs image judgment. The image judgment is judgment on whether or not the image of the visitor can be used for synthesis of an attraction picture. For example, when the visitor closes his eyes when his image is taken, the image cannot be used. If the image cannot be used, the attendant inputs an instruction to take an image again to the attendant PC 130. If the image can be used, the attendant inputs an instruction to start image processing to the attendant PC 130. This instruction is sent to the image processing PC 14, and the image processing PC 14 generates character data and stores it in the file server 116.

On the attendant PC 130, the sex (gender) and age of a visitor are judged by image processing of the image data of the visitor (the sex and the age may be judged by the image processing PC 14). The judgment of the sex and the age may be realized by any well-known image processing technique. The attendant PC 130 automatically determines casting on the basis of the sex and the age of visitors. Here, the attendant PC 130 executes a casting determination program. This program includes an algorithm for automatically determining casting. This algorithm is configured so that the age and sex of the visitors are close the set age and set sex of the characters as a whole. As a simple example, the visitors are divided into a male group and a female group, and the visitors in each group are arrayed in order of age. The characters are similarly arrayed. Then, one visitor is assigned to one character in the order of the array. If there are more male visitors than male characters, the excessive male visitors are assigned to female characters to adjust the casting. In the case of more female visitors than female characters, similar adjustment is performed. The characters are originally set in a manner that such change in the sex does not cause a problem. A more complicated algorithm may be applied to the setting of characters.

The attendant PC 130 may determine casting on the basis of any one of the sex and the age, within the scope of the present invention. Furthermore, the attendant PC may determine casting not on the basis of the sex and the age. For example, the attendant PC 130 may determine casting at random.

The casting data is sent from the attendant PC 130 to the file server 116 via the image processing PC 14 together with the sex data and the age data. Then, the casting data, the sex data and the age data are stored in the file server 116 together with the character data. The file server 116 stores data of twenty visitors of each booth. Since the file server 116 stores data of the four booths, it stores data of eighty visitors in total.

The pre-show system 118 may be provided with a plurality of three-dimensional scanners 12, a plurality of image processing PCs 14 and a plurality of attendant PCs 130 in order to perform necessary processing in a short time. The control state and the operation state of the apparatuses are sequentially reported to the attraction control apparatus 100.

Next, the configuration of the main show system 120 will be described. The main show system 120 includes a synthesis apparatus 132 and a sending PC (personal computer) 134. The configuration of the synthesis apparatus 132 corresponds to the configuration of the attraction picture generation apparatus 16 and the image scenario storage server 18 in FIG. 1. The synthesis apparatus 132 acquires character data from the file server 116 and generates an attraction picture. The synthesis apparatus 132 generates a booth picture. The character data is synthesized with a background image in accordance with character scenario data.

The synthesis apparatus 132 acquires a plurality of character data obtained from a plurality of visitors. The synthesis apparatus 132 also acquires data of casting (assignment of characters) from the file server 116. Then, the synthesis apparatus 132 processes the character data of each visitor with the use of character scenario data of a character assigned to the visitor. Thereby, the character data of the visitors move in the picture in accordance with the casting.

The synthesis apparatus 132 is controlled by the sending PC 134. Control data is sent from the synthesis apparatus 132 to the sending PC 134. The booth picture is sent from the synthesis apparatus 132 to the picture sending apparatus 22 via the sending PC 134.

The sending PC 134 controls the synthesis apparatus as described below and controls provision of an attraction picture in a target booth. The sending PC 134 is connected to a synchronization signal generation apparatus 136 which functions as a synchronization control apparatus. The synchronization signal generation apparatus 136 is controlled by the attraction control apparatus 100. The synchronization signal generation apparatus 136 generates time code data and a black burst signal as synchronization signals and sends these signals to the sending PC 134. The time code data and the black burst signal are data which instructs the image synthesis processing timing and the image sending timing.

The sending PC 134 instructs the synthesis apparatus 132 to synthesize a booth picture, on the basis of the time code data. The sending PC 134 sends the frame number of a frame targeted by synthesis at each time point to the synthesis apparatus 132. The synthesis apparatus 132 synthesizes the image of the frame of the specified frame number. The synthesized image is outputted to the sending PC 134 and accumulated in the sending PC 134. The specification of a frame number and the synthesis of a frame are repeatedly performed, and frame data are sequentially generated.

The sending PC 134 selects an image to be sent, from the group of accumulated frames in accordance with the time code data. Then, the selected image is sent from the sending PC 134 to the picture sending apparatus 22 and projected onto the screen 70. The sending timing is adjusted by the black burst signal.

The synthesis of a booth picture described above is performed in real time. Specifically, the sending PC 134 instructs the synthesis apparatus 132 to start synthesis a predetermined time before start of sending a picture, on the basis of the time code data. Here, the first frame number is communicated from the sending PC 134 to the synthesis apparatus 132. For example, synthesis of an image is started fifteen seconds before start of sending an attraction picture. Then, sending of the image is started. The image synthesis by the synthesis apparatus 132 and the image sending by the sending PC 134 are performed in parallel. This operation is performed in a state that a time lag of several seconds between the image synthesis and the image sending is kept. As described above, images inputted from the synthesis apparatus 132 are accumulated in the sending PC 134. Thereby, the sending PC 134 functions as a buffer for a picture corresponding to several seconds.

A booth picture is synthesized by the synthesis apparatus 132 as described above. As shown in FIG. 11, the sending PC 134 sends out a combined-theater picture after sending out a booth picture. More precisely, the sending PC 134 sends a partial theater picture corresponding to a quarter of a combined-theater picture. Images of visitors do not have to be incorporated in the partial theater picture. Therefore, a partial theater picture is held by the sending PC 134 in advance. The sending PC 134 sends out the partial theater picture after the booth picture, as the attraction picture.

The partial theater picture is also sent out in accordance with the time code data and the black burst signal. An image to be sent out is selected on the basis of the time code data, and the timing is adjusted by the black burst signal.

As already described before, visitors may be incorporated in the combined-theater picture similarly to the booth picture. In this case, the combined-theater picture may be also generated by the synthesis apparatus under the control of the sending PC 134.

The time code data and the black burst signal are sent out from one synchronization signal generation apparatus 136 to the four sending PC 134 of the four booths. Thereby, the timing of progress of the attraction picture is adjusted in the four booths of one theater.

FIG. 13 shows one synthesis apparatus 132. Actually, however, it is preferable, in an actual system, to provide a plurality of synthesis apparatuses 132 in order to realize real-time rendering. In the main show system 120 also, the control state and the operation state of the apparatus are sequentially reported to the attraction control apparatus 100.

As shown in FIG. 13, the sending PC 134 is connected to a web server 138. The sending PC 134 also sends out an attraction picture to the web server 138. The web server 138 receives the attraction picture data from the sending PC 134 and stores it. The web server has the functions of a WWW server and provides the attraction picture data via a network. The network is typically the Internet.

In the pre-show system 118 and the main show system described above, more precisely, the image-related processing may be performed as described below. The three-dimensional scanner 12 generates scanned data and texture data, and outputs these data. The scanned data is data of the shape of a face. The texture data is a two-dimensional image of the face, and it is typically a front-view image taken from the front of the face. The texture data is used for texture mapping. The image processing PC 14 sends thumbnail images to the attendant PC 130. The thumbnail images are three-dimensional and two-dimensional images. The two-dimensional image corresponds to the texture data described above.

When an instruction to start image processing is inputted from the attendant PC 130, the image processing PC 14 starts generation of character data. The image processing PC 14 generates "standard model data" and "a set of a plurality of kinds of sample expression data" as the character data of each visitor as already described before. The standard model data is also referred to as fitting data. The sample expression data is data which specifies the shape of a face. The standard model data and the set of sample expression data are generated for each character (that is, for each visitor). The standard model data and the set of sample expression data as described above are stored in the file server 116 and used for synthesis processing by the synthesis apparatus 132. The synthesis apparatus 132 blends a plurality of sample expression data in accordance with blend data to transform the standard model data. The blend data is included in character scenario data as data which specifies expressions. Thereby, the synthesis apparatus 132 generates image data of various expressions.

The pre-show system 118 may also determine the iris color from the face image of a visitor and generate iris color data. The iris color data is outputted from the image processing PC 14 and stored in the file server 116. Then, the iris color data is sent from the file server 116 to the synthesis apparatus 132 and used for image synthesis. The color of the eyes of a character is adjusted in accordance with the iris color data to make the image of the character more similar to the actual visitor.

Next, the operation of the attraction system 50 will be described with reference to FIGS. 16 and 17. Here, an attraction story composed as described below will be given as an example.

The characters (visitors) of one booth are inhabitants on the same planet.

A different planet is set for each booth.

The characters of the booth travel to space as the crews of a spaceship.

The spaceships of the four booths gather after adventures in space.

The four spaceships start for the earth together as a fleet.

Fleets gather from three planet systems, and the finale of the story comes.

An attraction show is configured by a pre-show and a main show. FIG. 16 shows the operation of the pre-show, and FIG. 17 shows the operation of the main show. For both of the pre-show and the main show, the length of one round is twenty minutes.

Figure 16:
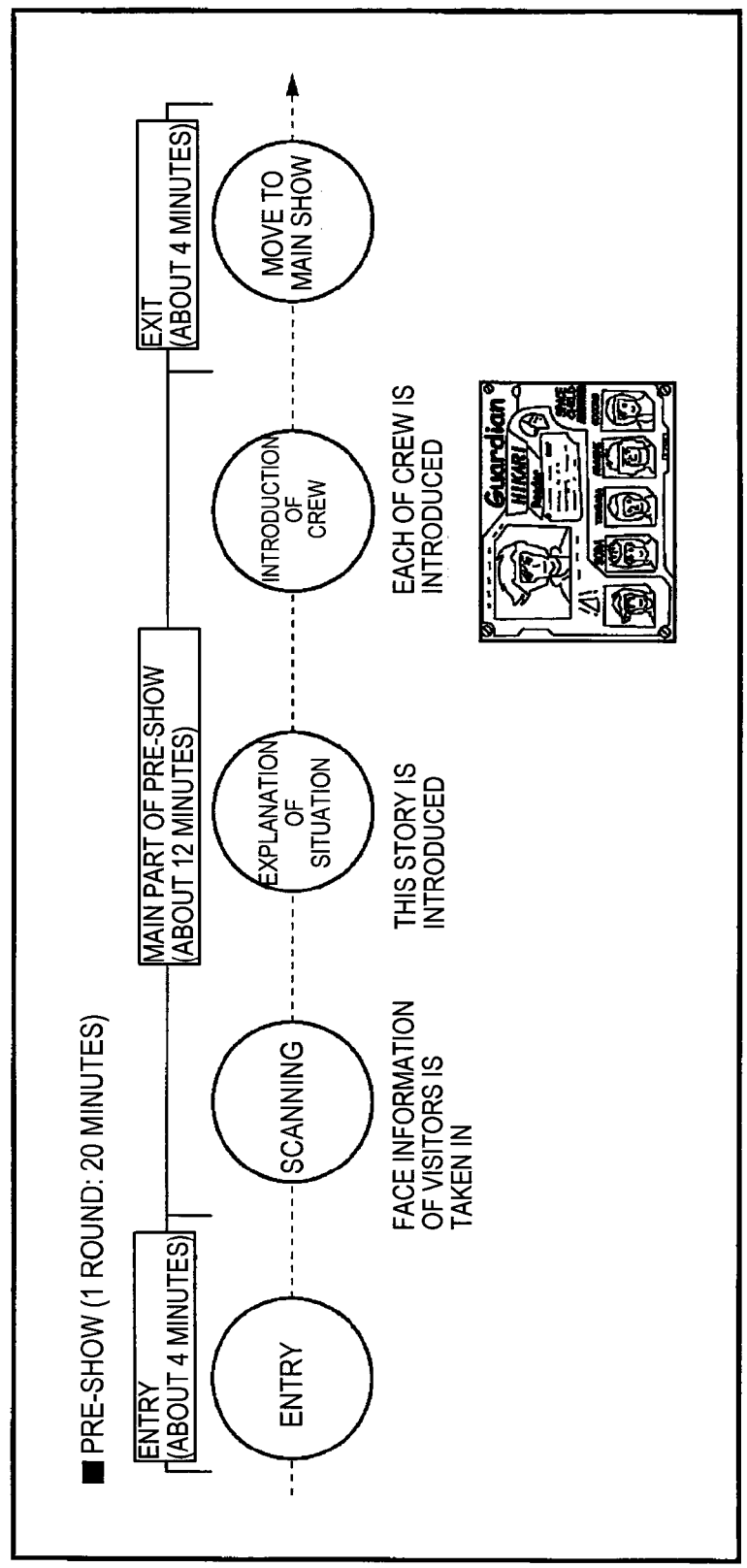
FIG. 16 is a diagram showing the whole operation of the attraction system, and it is a diagram showing the operation of a pre-show.
Figure 17:
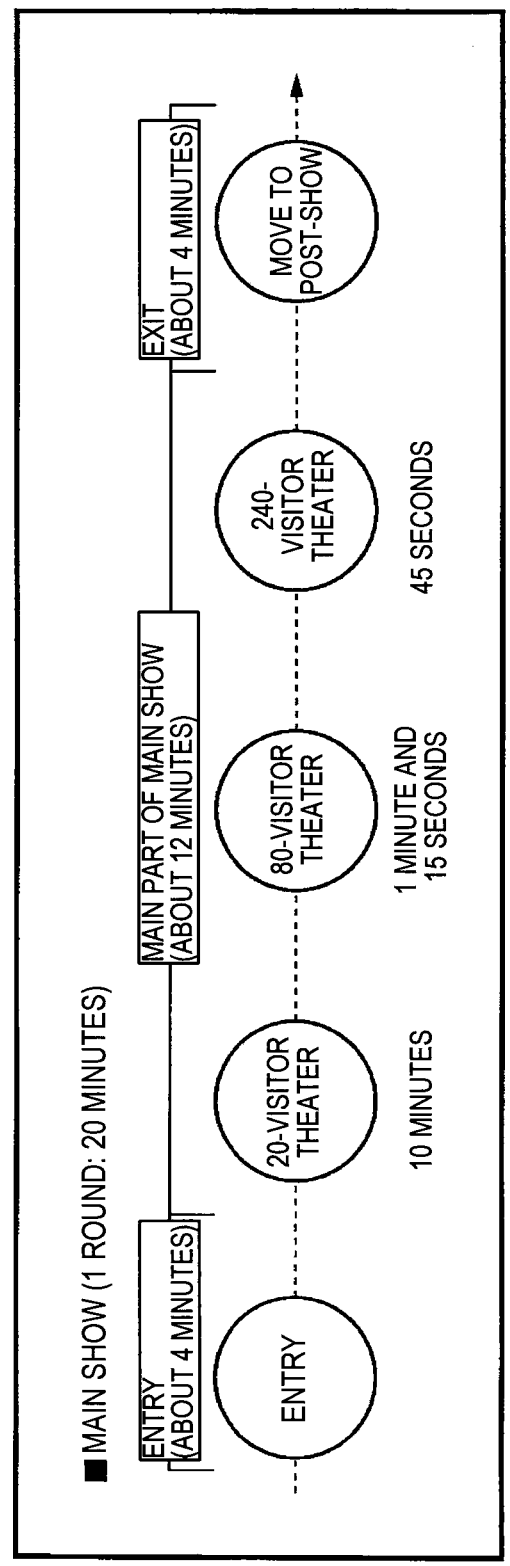
FIG. 17 is a diagram showing the whole operation of the attraction system, and it is a diagram showing the operation of a main show.

Referring to FIG. 16, the pre-show is configured by entry for about four minutes, the main part of the pre-show for about twelve minutes, and exit for about four minutes.

At the entry, two hundred and forty visitors enter the pre-show room 60 and sit on the pre-show seats 80. Each of the three pre-show rooms 60 seats eighty visitors.

During the main part of the pre-show, each visitor's face is scanned by the three-dimensional scanner 12 first. The scanned data is used for generation of character data. Image processing is performed by the image processing PC 14 during the pre-show, and character data is generated.

After the scanning, the situation is explained by a picture. Explanation is given on parts of the above-described attraction story which need to be explained. That is, it is explained that the characters of the booth are on the same planet and they go on board a spaceship.

After the explanation of the situation, each crew member is introduced by a picture. Here, the character data generated from the scanned data may be used. Different characters are assigned to the twenty visitors, respectively. The role of each character is introduced with a face image being shown.

When the introduction of the crew ends, the visitors exit the pre-show room 60 and move into the main show room 62.

Next, the main show will be described with reference to FIG. 17. The main show is configured by entry for about four minutes, the main part of the main show for about twelve minutes, and exit for about four minutes. The main part of the main show is provided by the twenty-visitor theater, the eighty-visitor theater and the two-hundred-and-forty theater.

At the entry, the visitors enter the main show room from the pre-show room 60 and sit on the main show seats 78.

At this stage, the theater 54 is already in the state of the twenty-visitor theaters shown in FIGS. 4 and 5. The main show room 62 is divided in the four booths 64 by the booth partition walls 68. Each booth 64 seats twenty visitors.

In the main part of the main show, provision of the attraction picture is started. In the theaters, the pictures of the four picture sending apparatuses 20 simultaneously start and simultaneously progress.

At the main part of the main show, a booth picture is provided in the booth 64 of the twenty-visitor theater first. The booth picture is a picture in which the seated twenty visitors appear as characters. The twenty characters go on board the same spaceship in the picture and experience an adventure in space. The stories of all the booths 64 may be the same or may be different from one another.

The length of the booth picture is ten minutes. When the booth picture ends, the moving mechanism control apparatus 106 (theater control section) performs control for transition from the twenty-visitor theaters to an eighty-visitor theater, as described below.

When the booth picture ends, the moving mechanism control apparatus 106 controls the booth partition wall moving mechanism 108 to move the booth partition walls 68 at a predetermined switching timing. Thereby, in each of the three theaters 54, the four booths 64 are combined to form the combined theater 66 as shown in FIGS. 6 and 7.

The switching timing is not strictly the same as the time point when the booth pictures end. The time required for moving the booth partition walls 68 may be taken into account. The movement of the booth partition walls 68 may start a little before (or after) the time point when the booth pictures end. Such control is also included in "the movement of the booth partition walls 68 performed when the booth pictures end" in the present invention.

The moving mechanism control apparatus 106 measures, for example, the time elapsed after an attraction picture starts with a timer and thereby detects that the switching timing has come. The moving mechanism control apparatus 106 may receive information indicating the switching timing from the outside. The moving mechanism control apparatus 106 may receive time code data from the synchronization signal generation apparatus 136.

In the eighty-visitor theater, a combined-theater picture is provided. As described with reference to FIG. 11, the picture sending apparatus 20 of each booth projects a partial theater picture corresponding to a quarter of the combined-theater picture on the divided screen 72. Thereby, a large-scaled picture adjusted to the size of the combined screen 74 is provided. In order that the pictures of the four picture sending apparatuses 20 transition from booth pictures to a combined-theater picture at the same time, outputs of the pictures are synchronized.

The combined-theater picture is a picture of a fleet formed by gathering of the spaceships of the four booths 64, and the fleet goes toward the earth through space. In the combined-theater picture also, the visitors may be incorporated as characters, as already described.

The length of the combined-theater picture is one minute and fifteen seconds, and the attraction picture ends in the state of the combined-theater picture. When the combined-theater picture ends, the moving mechanism control apparatus 106 performs control for transition from the eighty-visitor theaters to a two-hundred-and-forty-visitor theater.

When the combined-theater picture ends, the moving mechanism control apparatus 106 controls the screen moving mechanism 110 to move the screen 70 at a predetermined switching timing. At the same time, the moving mechanism control apparatus 106 controls the ceiling moving mechanism 112 to move the ceiling 82. Thereby, the partitions of the three combined theaters 66 are removed as shown in FIGS. 8 and 9.

Similarly as described in relation to the control of the booth partition walls 68, the switching timing of the screen 70 and the ceiling 82 does not have to be strictly the same as the time point when the combined-theater picture ends. The time required for moving the screen 70 and the ceiling 82 may be taken into account. The movement of the screen 70 and the ceiling 82 may start a little before (or after) the time point when the combined-theater picture ends. Furthermore, the switching timings of the screen 70 and the ceiling 82 may be different. Such control is also included in "the movement of the screen 70 and the ceiling 82 performed when the combined-theater pictures end" in the present invention.

Furthermore, the moving mechanism control apparatus may detect that the switching timing of the screen 70 and the ceiling 82 has come by processing similar to the detection of the switching timing of the booth partition walls 68. For example, the switching timing is detected with the use of a timer.

In the two-hundred-and-forty-visitor theater, the three combined theaters 66 are further combined. The two hundred and forty visitors meet face to face and see the central common object 84 above them. The scene of people of the three planet systems gathering is assumed here. The central common object 84 is the symbol of the earth. The time set for the two-hundred-and-forty-visitor theater is forty five seconds.

Then, the main part of the main show ends. The visitors exit and move to a post-show. The post-show is provided in a post-show room (not shown). Various kinds of novelty goods are sold. An image of each visitor appearing in the picture may be handed as a novelty.

After leaving the theater, the visitors can access the web server 138 via the Internet, browse the image in which they appear, and download the image.

[Booth Fault]

First, problems of a booth fault (booth failure) will be described first. In this embodiment, the booth fault means a fault of a picture system which occurs in each booth, and especially, the booth fault means a fault which disables generation of a booth picture in which a picture of visitors is incorporated. A booth fault occurs, for example, due to a failure of the synthesis apparatus 132. Furthermore, a booth fault occurs, for example, due to a failure of the pre-show system 118.

As has been described, in the attraction system 50, four booths are combined, and a combined-theater picture is projected on four screens. However, when the picture of a part of the booths is not provided due to occurrence of a booth fault, a part of the combined-theater picture is lost, direction of the four-plane combined screen becomes impossible, and the attraction cannot be provided. In order to avoid such a situation from occurring, the attraction system 50 of this embodiment is configured as described below.

Figure 18:
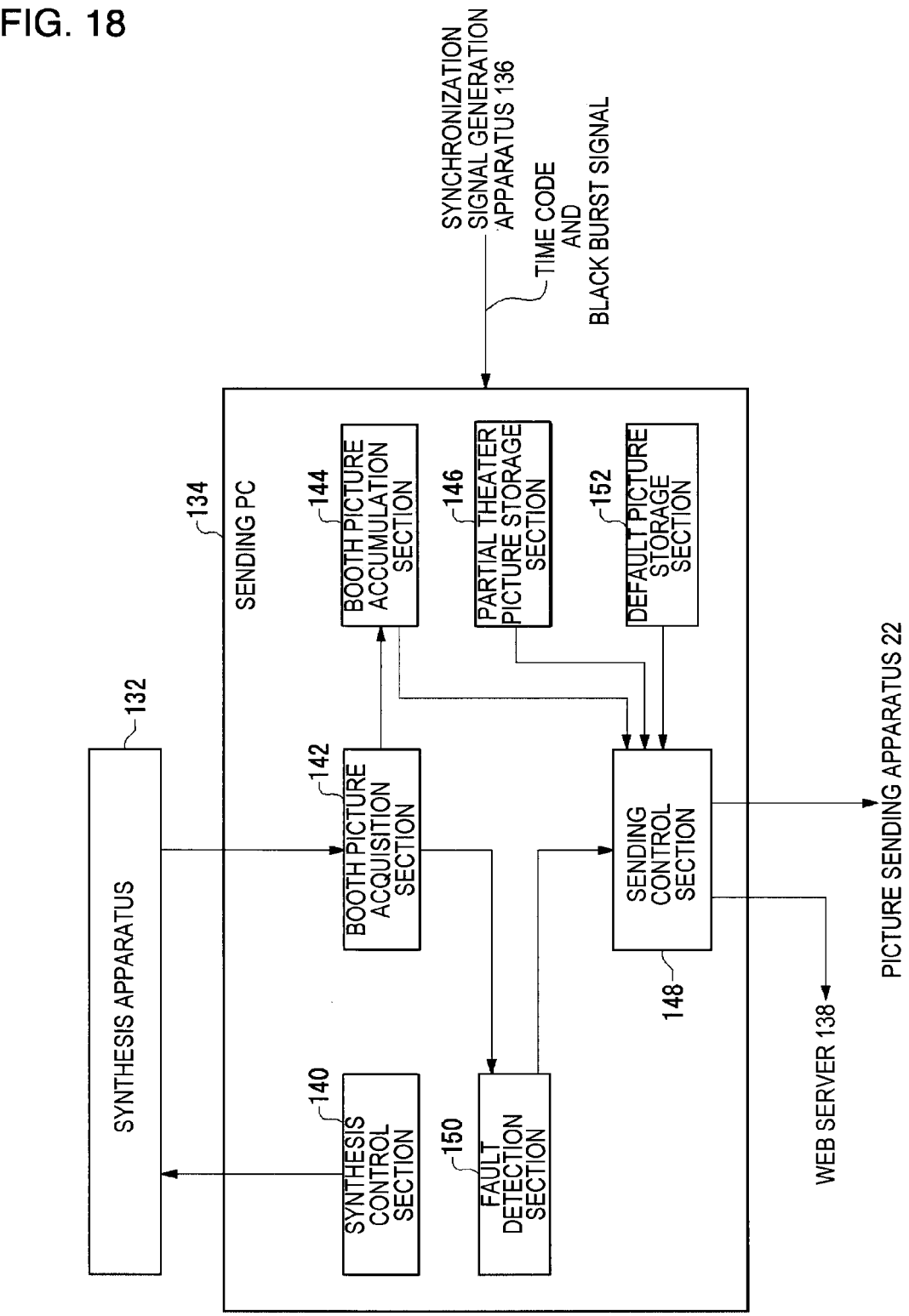
FIG. 18 is a block diagram showing the configuration of a sending personal computer.

FIG. 18 shows the configuration of the sending PC 134. The sending PC 134 has a synthesis control section 140, a booth picture acquisition section 142, a booth picture accumulation section 144, a partial theater picture storage section 146 and a sending control section 148. The configuration provides a normal attraction in a normal state in which any fault has not occurred. Furthermore, the sending PC 134 is provided with a fault detection section 150 and a default picture storage section 152. These function when a booth fault occurs.

To the sending PC 134, time code data and a black burst signal are inputted from the synchronization signal generation apparatus 136. The synthesis control section 140 controls the synthesis apparatus 132 to perform synthesis of a booth picture. The booth picture acquisition section 142 receives a booth picture outputted from the synthesis apparatus 132. The booth picture is accumulated in the booth picture accumulation section 144. The booth picture accumulation section 144 is a buffer for accumulating a booth picture corresponding to several seconds. The partial theater picture storage section 146 stores a partial theater picture. The sending control section 148 reads the booth picture from the booth picture accumulation section 144 and sends it out to the picture sending apparatus 22. Furthermore, the sending control section 148 reads the partial theater picture from the partial theater picture storage section 146 and sends it out to the picture sending apparatus 22.

The fault detection section 150 automatically detects occurrence of a booth fault. When a booth fault occurs, a booth picture is not received by the booth picture acquisition section 142. Therefore, the fault detection section 150 monitors the state of the booth picture acquisition section 142, and judges that a fault has occurred when a booth picture is not received.

The default picture storage section 152 stores a default booth picture. The default booth picture is a booth picture in which images of visitors are not incorporated but default character images are incorporated. The default booth picture is generated in advance. For example, a third person's face is scanned to generate character data, and the character data is synthesized with a background image and the like to generate a default booth picture.

When the fault detection section 150 detects a fault, the occurrence of the fault is communicated to the sending control section 148. Then, the sending control section 148 automatically switches a booth picture to a default booth picture. The sending control section 148 reads the default booth picture from the default picture storage section 152 instead of reading from the booth picture accumulation section 144. The sending control section 148 sends out the default booth picture to the picture sending apparatus 22, and then, it sends out the partial theater picture in the partial theater picture storage section 146 to the picture sending apparatus 22.

When a booth fault occurs, the attraction system 50 of this embodiment operates as described below. In this embodiment, the systems of the four booths are arranged in parallel, excluding the file server, the attraction control apparatus and the synchronization signal generation apparatus, as described in FIGS. 14 and 15. Therefore, when a booth fault occurs, the booth fault does not influence normal booths where a booth fault has not occurred. The normal booths operate as usual and provide an attraction picture configured by a booth picture and a partial theater picture.

On the other hand, in the booth where the booth fault has occurred, the attraction picture is switched from a booth picture to a default booth picture. The booth having the fault provides an attraction picture configured by the default booth picture and a partial theater picture. Therefore, it is possible to avoid loss of a part of the attraction picture and continue using the normal booths.

Thus, in this embodiment, even when a booth fault occurs, a default picture is provided if the sending PC of the booth normally functions, and, thereby, the pictures of all the booths are provided. It is possible to avoid loss of a part of the picture in the state that the theaters are combined and avoid such a situation that the attraction is not realized. It is possible to avoid the closure of the whole theater and continue providing the attraction using the normal booths.

There are conceived a case that a booth fault occurs before start of an attraction and a case that a booth fault occurs after start of an attraction. In both cases, the configuration and the operation of the sending PC 134 can be the same. If a booth picture is not sent from the synthesis apparatus 132, the sending PC 134 judges that a booth fault has occurred and provides a default booth picture. Since the configuration of the sending PC 134 can be the same irrespective of the time of occurrence of a booth fault, the system configuration is simple in this regard.

The default picture storage section 152 may store a partial theater picture together with a default booth picture. In this case, when a booth fault occurs, the sending control section 148 reads all the attraction picture from the default picture storage section 152 and outputs it to the picture sending apparatus 22.

In this embodiment, character data may be incorporated in a combined theater picture, as already described. In this case, the default picture of the partial theater picture is also stored in the sending PC 134. When a booth picture or a partial theater picture is not received from the synthesis apparatus 132, the sending PC 134 judges that a booth fault has occurred. When a booth fault occurs, the sending PC 134 outputs default pictures of a booth picture and a partial theater picture.

[Theater Fault]

Next, a theater fault (theater failure) will be described. In this embodiment, the theater fault means a fault which occurs in each theater. The theater fault is typically a failure of some apparatus provided in one theater. The theater fault is, for example, a failure of the moving mechanism control apparatus 106. Furthermore, the theater fault is, for example, a failure of the booth partition wall moving mechanism 108, the screen moving mechanism 110 or the ceiling moving mechanism 112. The attraction system 50 of this embodiment is configured as described below in order to preferably cope with the theater fault.

In the attraction system 50 of this embodiment, the systems of the three theaters A, B and C are provided in parallel excluding the attraction control apparatus 100, as described with FIGS. 12 and 13. More precisely, the moving mechanisms and the picture systems of the three theaters A, B and C are arranged in parallel. The moving mechanisms are for the booth partition walls, the screen and the ceiling (the booth partition wall moving mechanism carries out a theater size changing function). The theaters A, B and C are independently controlled by the attraction control apparatus 100. Accordingly, the attraction control apparatus 100 stops the functions of a theater where a fault has occurred and continues the operation of the functions of normal theaters where a fault has not occurred.

In FIG. 12, in addition to the control of the whole system, the attraction control apparatus 100 also monitors the progress condition of the attraction of each theater and each booth, the operation condition of each apparatus, the network state, and the like. The network connects apparatuses, such as computers, constituting the system to one another. In the case where an error is found in any of the various apparatuses, the attraction control apparatus 100 displays the condition of the error on the operation screen. The operator inputs an instruction to stop the functions of the theater where the occurrence of a fault has been detected, to the attraction control apparatus 100. In response to this instruction input, the attraction control apparatus 100 stops the various functions of the theater where the fault has occurred. Specifically, the attraction control apparatus 100 stops the moving mechanisms and the picture providing function of a target theater. Furthermore, the attraction control apparatus 100 also stops provision of voice in the target theater. Since the three theaters are independent from one another, the functions of the other two normal theaters keep operating.

The attraction control apparatus 100 may be operated as shown below. On the screen of the attraction control apparatus 100, it is possible to perform an ON/OFF operation of the booth partition wall, screen and ceiling moving functions for each theater. As for the function of the picture providing system, it is possible to perform an ON/OFF operation for each booth. Accordingly, when a fault occurs, the operator turns off the moving function of the theater concerned, and it further turns off the picture providing systems of the four booths existing in the theater concerned. Thereby, the functions of the theater are stopped. The functions of the two normal theaters keep operating.

As described above, in this embodiment, when a theater fault occurs, the attraction control apparatus 100 can stop the functions of the theater where the fault has occurred and continue the operation of the functions of the other theaters. Thus, it is possible to continue provision of an attraction with the use of the normal theaters without closing the attraction facility.

[Voice System]

Next, a preferred example of a voice system in the attraction system 50 of this embodiment will be described. This system is configured to automatically identify the sex of a visitor and output the voice of words in a picture with a voice corresponding to the sex of the visitor.

Figure 19:
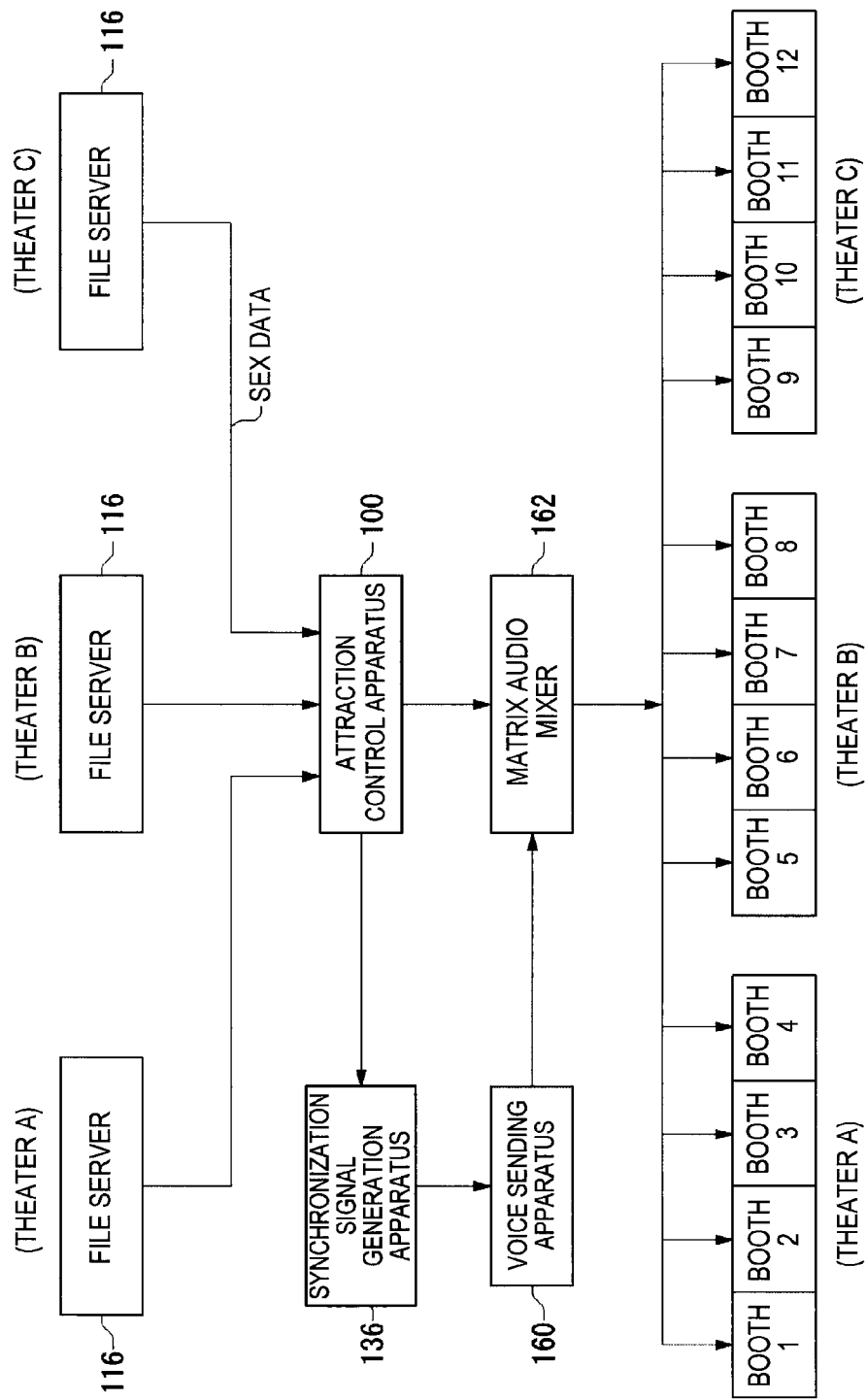
FIG. 19 is a block diagram showing the configuration of a voice system.

FIG. 19 shows the voice system of the attraction system 50. The voice system is configured by a voice sending apparatus 160, a matrix audio mixer 162, the three file servers 116, the attraction control apparatus 100 and the synchronization signal generation apparatus 136.

The voice sending apparatus 160 stores data of voice materials of all characters, sound effects and BGM. These voices are recorded in stereo. The number of characters is twenty (the number of visitors for one booth). The voice of each character is the voice of the lines of the character. In this embodiment, especially the voice sending apparatus 160 stores male and female voices of the twenty characters. Therefore, voices of forty characters are stored in total.

The voice sending apparatus 160 has ninety-six channel outputs. About ten channels output stereo voices of the BGM and the sound effects. Eighty channels output the voices of all the characters. The number of characters is twenty, male and female voices are outputted, and furthermore, stereo voices are outputted. Therefore, eighty channels are required.

The voice sending apparatus 160 is connected to the matrix audio mixer 162, and the matrix audio mixer 162 is connected to all the speakers of all the booths. The number of booths is twelve. In each booth, voice is provided to a group of speakers for twenty chairs, as described with the use of FIG. 10.

The matrix audio mixer 162 has at least twenty-four output channels. Thereby, the matrix audio mixer 162 can change voice output according to the booths. Since there are twelve booths and stereo voice is outputted, outputs of twenty-four channels are required.

The matrix audio mixer 162 can change voice according to the booths by setting a cross point for each booth output. By utilizing this function, the voice of each character of each booth is selected from between the male voice and the female voices inputted from the voice sending apparatus 160 so that the voice corresponds to the sex of the actual visitor. The matrix audio mixer is controlled by the attraction control apparatus 100.

Next, the operation of the voice system in FIG. 19 will be described. As described in relation to the picture system, the sex of each visitor is automatically identified from a taken image during image processing, in this embodiment. This sex data is outputted from the pre-show system of each booth together with data of an assigned character and stored in the file server 116 (sex data for each character).

The attraction control apparatus 100 reads the sex data of all the characters of all the booths, from the three file servers 116 provided for the three theaters. The attraction control apparatus 100 controls the matrix audio mixer 162 on the basis of the sex data, and sets a cross point for each output of each booth. In order that the voice of each character corresponds to the sex of an actual visitor, the attraction control apparatus 100 selects one of the male voice and the female voice for the input channel for the character. Such cross point setting is performed for all the characters of all the booths. Furthermore, a cross point is also set for the BGM and the sound effects.

The attraction control apparatus 100 controls the synchronization signal generation apparatus 136 to control the operation of the voice sending apparatus 160. As already described, the synchronization signal generation apparatus 136 generates time code data under the control of the attraction control apparatus 100. The time code data is provided for the voice sending apparatus 160. The voice sending apparatus 160 outputs voice to the matrix audio mixer 162 in accordance with the time code. The matrix audio mixer 162 operates in accordance with the cross point setting and outputs voice to each booth. The voice is sent to the chairs including speakers which are installed in each booth and amplified there.

Since a cross point is set on the basis of the sex data as described above, each character in an attraction picture talks with voice corresponding to the sex of the visitor assigned to the character, in each booth. For example, it is supposedly assumed that a male visitor is assigned to a certain character in one booth, and a female visitor is assigned to the same character in another booth. In such a case, the voice of the character matches the sex of the visitor according to this embodiment, and, thereby, the visitor's feeling as if he/she were in the picture is increased.

The advantage of the voice system of this embodiment will be further described. First, it is supposedly assumed that the voice system of this embodiment is not applied. In this case, it is conceivable that the voice of each character is fixed as a male voice or a female voice. In such a configuration, however, the possibility that the voices of a part of characters do not correspond to the sex of visitors is high. As a result, the image of a visitor talks with a voice of a sex different from the actual sex of the visitor, the visitor's feeling as if he/she were in the picture is impaired.

In order to avoid such a situation, sex restriction of visitors is conceivable. It is supposedly assumed that the number of male characters is X and the number of female characters is Y. In this case, the number of male visitors is limited to X, and the number of female visitors is limited to Y. Thereby, it is possible to set casting in which the voice of characters correspond to the sex of visitors.

However, an unspecified number of visitors gather in an attraction facility. In view of this point, it is actually difficult to perform the visitor restriction described above. In comparison, the voice system of this embodiment can advantageously increase the visitor's feeling as if he/she were in the picture without restricting visitors.

In this embodiment, voice is adjusted to correspond to the sex of a visitor. In a variation example, the voice may be further adjusted to correspond to the age of the visitor. The voice sending apparatus 160 stores voices of men and women of a plurality of ages. The matrix audio mixer 162 selects and outputs a voice based on the result of judgment of the sex and age of a visitor. For example, voices of persons in their teens, twenties, thirties, . . . are prepared, and selection is made therefrom. Such processing is performed for each of all the characters.

[Emergency Stop Function]

Next, description will be made on an emergency stop function in the attraction system of this embodiment. In this embodiment, the two kinds of emergency stop functions shown below are provided in a manner that they are suited for the configuration of the attraction system in which the booth partition walls and the screens move.

Figure 20:
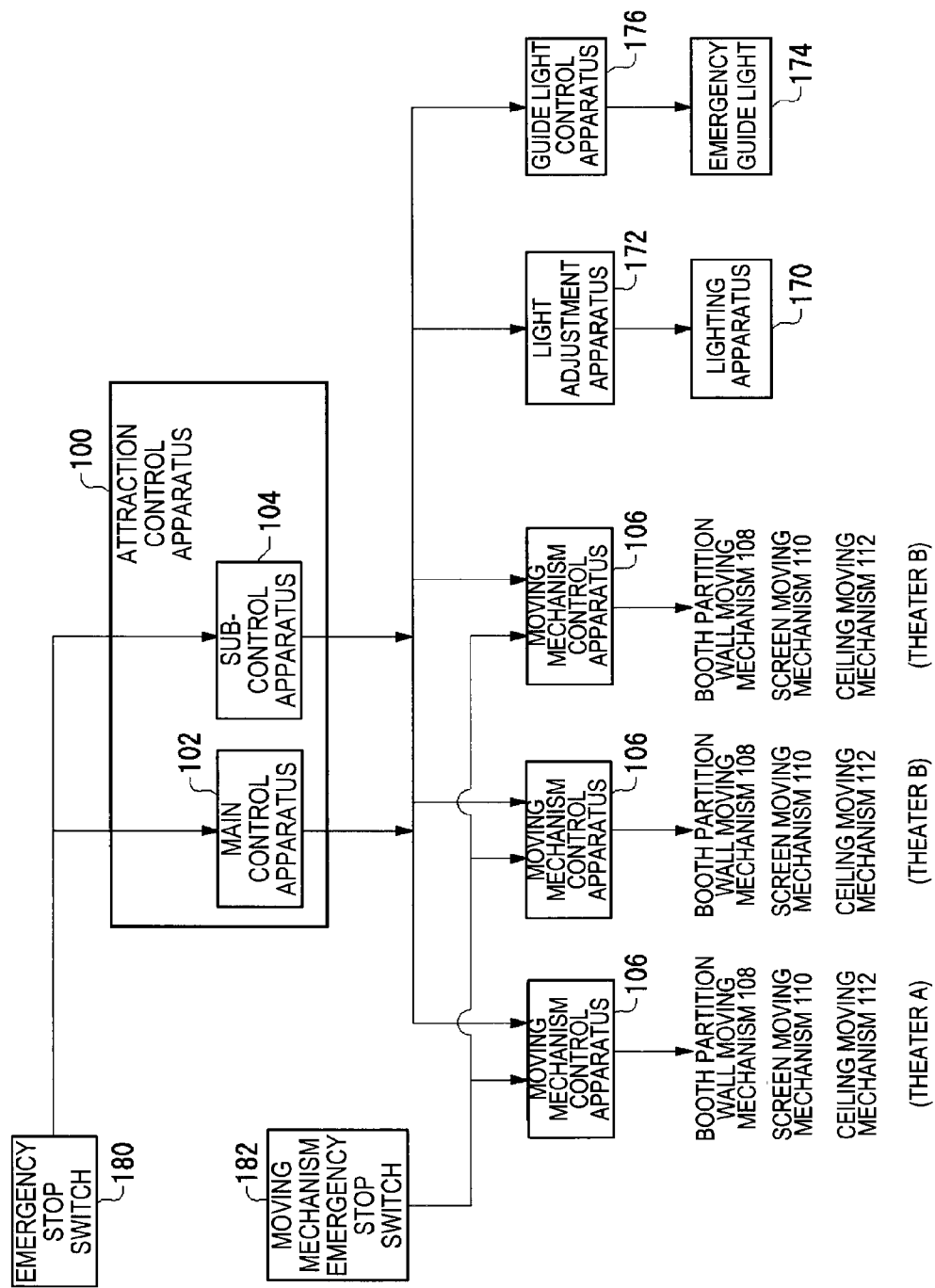
FIG. 20 is a block diagram showing the configuration related to emergency stop functions.

FIG. 20 is a block diagram showing the configuration related to the emergency stop functions. As already described, the attraction control apparatus is configured by the main control apparatus 102 and the sub-control apparatus 104 and controls the whole attraction system 50. The attraction control apparatus controls the moving mechanism control apparatuses 106 of the three theaters, and each of the moving mechanism control apparatuses 106 controls the booth partition wall moving mechanism 108, the screen moving mechanism 110 and the ceiling moving mechanism 112.

The attraction system 50 is provided with a lighting apparatus 170, a light adjustment apparatus 172 for controlling the lighting apparatus 170, an emergency guide light 174, and a guide light control apparatus 176 for controlling the emergency guide light 174. The attraction control apparatus 100 controls the lighting apparatus 170 by controlling the light adjustment apparatus 172, and controls the emergency guide light 174 by controlling the guide light control apparatus 176.

Furthermore, the attraction system 50 is provided with an emergency stop switch 180 and a moving mechanism emergency stop switch 182 in relation to the emergency stop functions. The emergency stop switch 180 is connected to the attraction control apparatus 100. More precisely, it is connected to both of the main control apparatus 102 and the sub-control apparatus 104. The moving mechanism emergency stop switch 182 is connected to the three moving mechanism control apparatuses 106 provided for the three theaters, respectively. In the figure, one emergency stop switch 180 and one moving mechanism emergency stop switch 182 are shown. Actually, however, a plurality of emergency stop switches 180 and a plurality of moving mechanism emergency stop switches 182 may be provided.

The moving mechanism emergency stop switch 182 is typically operated by a person in charge when the operation of the moving mechanism is considered to be dangerous. For example, when a visitor stands up and moves during an attraction, the moving mechanism emergency stop switch 182 is operated. Specifically, the moving mechanism emergency stop switch 182 may be pressed.

When the moving mechanism emergency stop switch 182 is operated, a moving mechanism emergency stop signal (ON signal) is inputted to the three moving mechanism control apparatuses 106. In response to this signal, each moving mechanism control apparatus 106 sets a movement prohibition mode. When the movement prohibition mode is set, moving the booth partition walls 68, the screen 70 and the ceiling 82 is prohibited. Accordingly, changing the theater size between the size of the four booths 64 and the size of the combined theater is also prohibited.

It is supposedly assumed that the moving mechanism emergency stop switch 182 is operated while the booth partition walls 68, the screen 70 or the ceiling 82 is moving. When the switch is operated during the operation of a moving mechanism, the mechanism which is moving stops. However, the progress of the attraction may be continued while the direction by the moving mechanism is stopped. The attraction picture may be continuously displayed.

It is supposedly assumed that the moving mechanism emergency stop switch 182 is operated while the moving mechanisms are not operating. In this case, the operation of the moving mechanisms is restrained even when the time for the moving mechanism to move comes. In this case also, the attraction may be continuously progressed.

The emergency stop switch 180 is typically operated by a person in charge when it is considered that the attraction should be stopped. For example, in the case of occurrence of a fire or a natural disaster, the emergency stop switch 180 is operated. Specifically, the emergency stop switch 180 may be pressed.

When the emergency stop switch 180 is operated, an emergency stop signal (ON signal) is inputted to the attraction control apparatus 100. In response to this signal, the attraction control apparatus 100 controls the light adjustment apparatus 172 to light the lighting apparatus 170. Furthermore, the attraction control apparatus 100 controls the guide light control apparatus 176 to light the emergency guide light 174.

Furthermore, the attraction control apparatus 100 controls the moving mechanism control apparatus 106 to open the booth partition walls 68, the screen 70 and the ceiling 82 which are in a closed state. The booth partition wall moving mechanism 108 moves the booth partition walls 68 backward. Thereby, the booth partition walls 68 are removed, and a combined theater is formed. The screen moving mechanism 110 causes the screen 70 to descend to remove it from the theater. Furthermore, the ceiling moving mechanism 112 moves the ceiling 82 backward to remove it. In this way, the booth partition walls 68, the screen 70 and the ceiling 82 move, and the theater is in an open state so that evacuation of the visitors is facilitated.

The emergency stop switch 180 is further linked with a cut relay of fire protection equipment and a vibration sensor of architectural equipment. When the cut relay for fire protection equipment or the vibration sensor for the architectural facility operates, the emergency stop switch 180 sends an emergency stop signal to the attraction control apparatus 100. Then, the attraction control apparatus 100 performs the emergency stop control as described above.

As described above, in this embodiment, in the case where a visitor walks, the moving mechanism emergency stop switch 182 operates, and movement of the moving mechanisms is prohibited. Furthermore, in the case of occurrence of a natural disaster or the like, the emergency stop switch 180 operates, the moving mechanisms operate to remove the partition walls and the screens, and the attraction facility is in an open state, so that visitors can easily evacuate. Thus, this embodiment can provide an emergency stop function suited for the characteristic attraction system in which the booth partition walls and the screens move.

Variation Examples

Some variation examples of this embodiment will be described. The number of visitors seated in the theaters is, of course, not limited to the number in the above example (twenty visitors, eighty visitors, and two hundred and forty visitors). Each of the plurality of theaters may seat a different number of visitors. Each of the plurality of booths may seat a different number of visitors.

In this embodiment, a combined-theater picture is provided after booth pictures are provided. Accompanying this, the booths 64 are combined during the attraction, and the combined theater 66 is formed. However, the present invention is not limited thereto. The combined-theater may be formed first. Combination and division may be performed. One or both of combination and division may be performed several times.

In this embodiment, a combined-theater picture is provided by four picture sending apparatuses. However, the combined-theater picture may be provided by one picture sending apparatus.

In this embodiment, there are two stages of theater size. However, the present invention is not limited thereto. For example, in the configuration in FIG. 3, two booths are combined first to form a combined theater with an intermediate size, and a combined-theater picture corresponding to this intermediate size is provided. Two intermediate-sized combined theaters are further combined to form a final combined theater, and a combined-theater picture adjusted to the size is provided there. In this configuration, the intermediate-sized theater can be understood as a combined theater when seen from the first booths, and it can be understood as a booth (divided theater) when seen from the final combined theater.

In this embodiment, the partition wall moving apparatus is configured by a motor. However, the partition wall moving apparatus may be provided with a hydraulic actuator and move the partition walls by hydraulic control. Similarly, the screen moving apparatus and the ceiling moving apparatus may be of the hydraulic type.

In this embodiment, each seat is provided with speakers. However, each seat may be provided with a headphone. In this case also, a system can be preferably realized which moves the booth partition walls during the progress of an attraction picture, reducing the influence of noises caused by moving partition walls.

Furthermore, as a variation example, it is also possible that the partition wall moving apparatus is not provided and a combined picture is not provided. In this case also, the advantage due to movement of the screen can be obtained.

The synthesis apparatus, which is the attraction picture generation apparatus, is preferably provided with a plurality of computers as already described. Those computers preferably share processing of a group of frames of moving images, which is an attraction picture. It is preferable to provide the plurality of computers for the picture of each booth. Due to such a configuration, even a personal computer can generate the attraction picture of this embodiment.

Advantages of the Present Invention

As described above, the present invention processes character scenario data which specifies the movements of characters along an attraction story. The present invention causes character data having the image of a visitor to move in accordance with this character scenario data. Thereby, the present invention can cause the image of the visitor appear in the attraction picture and further cause the image of the visitor to act. Consequently, it is possible to drastically increase the visitor's feeling as if he/she were in the picture and increase the pleasure.

Each of visitors can enjoy that a person having the same face as the visitor's face appears on the screen as an actor/actress (character) and lively act in the picture story.

Furthermore, it is also possible to cause an existing actor/actress or an entertainer to appear in the picture. Thus, it is possible to enjoy the feeling of acting together with a famous person.

Furthermore, it is possible to have experience which can be got only in a picture story. For example, a visitor can be put on a stage which he/she never actually experience, such as space and a scene in the ancient history. The visitor can also become a hero/heroin in a story and experience an extraordinary event.

Thus, according to the present invention, it is possible to increase the pleasure of visitors to an attraction system.

The three-dimensional scanner apparatus may generate three-dimensional images of visitors. Then, three-dimensional character data may be generated. Thereby, a three-dimensional attraction picture can be provided.

The three-dimensional scanner apparatus may be provided in a pre-show room for providing a pre-show of an attraction. Images of visitors may be generated while they are waiting for the main show of an attraction to begin. Thereby, it is possible to efficiently generate the images of visitors during the time while they are waiting for the main show of an attraction to begin.

Character scenario data may be stored, and a background image may be stored. Then, an attraction picture may be generated so that the character data operates in accordance with the character scenario data in the background image. Thereby, it is possible to provide a picture in which visitors appear and act in the background.

The attraction picture generation means may comprise expression changing means for changing the expression of the face of the character data in accordance with the character scenario data which specifies the expressions of the character's face along an attraction story and generates an attraction picture in which the expression of visitors' faces change. It is possible to generate an attraction picture in which the expression of visitor's face changes. For example, a picture in which visitors give performances of getting angry, crying and the like can be provided.

The attraction picture may be provided for visitors on the Web. Thereby, the visitors can enjoy the picture of their performance even after the show.

According to the present invention, the attraction system may comprise: voice data storage means storing male voice data and female voice data of each character in the attraction picture; sex judgment means for judging the sex of each visitor on the basis of the image of each visitor; selection means for selecting the male voice data or the female voice data of each character; and output means for outputting the voice of the voice data selected by the selection means; and the selection means may output the voice data corresponding to the sex of the visitor assigned to the character, on the basis of the result of the judgment by the sex judgment means. Therefore, it is possible to cause the image of a visitor to utter a voice corresponding to the actual sex of the visitor during picture attraction, and the visitor's feeling as if he/she were in the picture can be further increased. In the embodiment described above, the selection means is a mixer, to which male voice data and female voice data of each character are inputted and from which the male voice data or the female voice data is outputted. The mixer outputs voice data corresponding to the sex of the visitor assigned to the character on the basis of the result of the sex judgment.

According to the present invention, an attraction system comprises: a theater having a theater size which is changeable between the size of a plurality of adjacent booths and the size of a combined theater obtained by combining the plurality of booths; attraction picture providing means for providing an attraction picture including a booth picture provided in each of the plurality of booths and a combined-theater picture provided in the combined theater, the booth picture in the attraction picture being a picture in which one or more images of visitors seated in the corresponding booth are incorporated as characters; and theater size changing means for changing the theater size in accordance with the progress of the attraction picture so that the theater is divided into the plurality of booths when the plurality of booth pictures are provided and the plurality of booths are combined to form the combined theater when the combined-theater picture is provided. In the embodiment described above, the theater size changing means is configured by moving mechanism of booth partition walls and a control apparatus therefor.

According to the present invention, it is possible to change the theater size between the size of a booth and the size of a combined theater. An attraction picture is configured by a booth picture and a combined-theater picture. The theater size is changed in accordance with the progress of the attraction picture so that the booth picture is provided in the booth, and a combined-theater picture is provided in the combined theater. Due to the combination of the booth picture and the combined-theater picture, it is possible to provide visitors with an attraction picture in which each visitor sufficiently appears and which enables a large-scaled picture to be seen and, thereby, enhance the pleasure of the visitors.

Each booth can seat a predetermined number of visitors, and the images of at least a part of the predetermined number of visitors may be incorporated in the booth picture.

The theater may comprise one or more booth partition walls for dividing the combined theater into the plurality of booths and a partition wall moving apparatus for moving the booth partition walls. By moving the booth partition walls, the plurality of booths can be combined and changed into the combined theater, or the combined theater can be divided and changed into the plurality of booths.

When the booth partition walls are removed, a combined screen of the combined theater may be constituted by a plurality of divided screens provided for the plurality of booths. The combined-theater picture with a size corresponding to the combined screen may be commonly provided for the visitors of the plurality of booths. Thereby, accompanying the removal of the partition walls, a large-scaled picture can be provided on the combined screen.

The attraction picture may be generated by distributed processing by a plurality of computers. Thereby, the processing performance of real-time rendering is secured, and it is possible to appropriately generate a picture configured by character images by real-time rendering and a background image by pre-rendering. This is especially advantageous when booth pictures and a combined theater picture are provided. That is, according to the present invention, by securing the real-time rendering performance, it is possible to prevent progress difference among the pictures of a plurality of adjacent booths. Thereby, transition from booth pictures to a combined theater picture can be performed smoothly.

A plurality of theaters may be provided. The plurality of theaters may be partitioned by theater partition means, and the theater partition means may be removed. The visitors of the plurality of theaters may be given common experience by meeting face to face when the theater partition means are removed. Since the plurality of theaters are further combined, more visitors can be seated. Furthermore, it is possible to provide an attraction which enables the many visitors to have a feeling of unity.

The theater partition means may comprise screens for providing the attraction picture. Thereby, when the screens are moved, the visitors in the different theaters meet face to face with one another. Such an element of surprise can further increase the pleasure.

According to the present invention, the combined picture may be a picture formed by a plurality of adjacent partial theater pictures provided on a plurality of screens provided for the plurality of booths, respectively. Each of the plurality of booths may provide the attraction picture including the booth picture and the partial theater picture. The attraction system may further comprise: a plurality of attraction picture generation means provided for the plurality of booths, respectively, each of the plurality of attraction picture generation means generating the booth picture of the corresponding booth; a plurality of default picture storage means provided for the plurality of booths, respectively, for storing a default booth picture in which the images of the visitors are not incorporated but default character images are incorporated; and a plurality of fault detection means provided for the plurality of booths, respectively, for detecting occurrence of a fault which disables generation of the booth picture. When a fault is detected by the fault detection means, the booth where the fault has been detected may provide the default booth picture and the partial theater picture, and the one or more booths where the fault has not been detected may provide the booth picture and the partial theater picture.

According to the present invention, even if the booth picture cannot be generated in a part of the booths, it is possible to avoid loss of a part of the picture of the combined theater. Thus, it is possible to continue provision of the attraction with the use of the remaining normal booths.

According to the present invention, a plurality of theaters may be provided; and the plurality of theaters may be partitioned by one or more theater partition members, the theater partition members being removable members, and the plurality of theaters may be arranged so that the visitors of the plurality of theaters meet face to face when the theater partition members are removed. The plurality of theaters may be arranged in parallel, each of the plurality of theaters being individually provided with a function of providing the attraction picture and a function of changing the theater size. The attraction system may comprise control means, and the control means is capable of, when a fault which disables provision of an attraction occurs in one of the plurality of theaters, stopping the functions of the theater where the fault has occurred and continuing the operation of the functions of the one or more theaters where the fault has not occurred.

According to the present invention, even when a fault occurs in a part of theaters, it is possible to provide the attraction with the use of the remaining theaters.

The attraction system may comprise an emergency stop switch and a moving mechanism emergency stop switch. When the emergency stop switch operates, the theater size may become the size of the combined theater, the screen of the theater may be removed, a lighting apparatus may be lighted, and an emergency guide light may be lighted. When the moving mechanism emergency stop switch operates, change of the theater size may be prohibited.

According to the present invention, when the emergency stop switch operates, it is possible to appropriately cope with it by performing combination of the booths and the like. When the moving mechanism emergency stop switch operates, change of the theater size can be prohibited. Thus, it is possible to cope with a state of emergency in the characteristic attraction system in which the booth partition walls and the screens move.

In another aspect of the present invention, the attraction system comprises: a theater; one or more booth partition members for partitioning the theater into a plurality of booths; a partition moving mechanism for moving the booth partition members to combine the plurality of booths to form a combined theater; and a plurality of picture sending apparatuses provided for the plurality of booths, respectively. When the theater is divided in the plurality of booths, each of the plurality of picture sending apparatuses sends a booth picture of the corresponding booth; and when the plurality of booths are combined and the combined theater is formed, a combined theater picture is formed by a plurality of adjacent partial theater pictures sent out from the plurality of picture sending apparatuses; and the booth picture of the booth is a picture in which one or more images of visitors seated in the corresponding booth are incorporated as characters.

According to this configuration also, the theater size is changed between the size of the booth and the size of the combined theater, and combination of a booth picture and a combined-theater picture is provided. Thus, it is possible to provide visitors with an attraction picture in which each visitor sufficiently appears and which enables a large-scaled picture to be seen and, thereby, enhance the pleasure of the visitors.

The present invention is not limited to aspects of an attraction system. Another aspect of the present invention is, for example, an attraction providing method or a program. In such a different aspect, the various advantages of the present invention described above can be obtained.

The preferred embodiments of the present invention conceivable at present have been described above. It is intended to make it understood that various variations of this embodiment are possible and to include all such variations within the true spirit and the scope of the present invention in the accompanying CLAIMS.

INDUSTRIAL APPLICABILITY

The present invention is useful as an attraction system for providing an attraction picture.

The invention claimed is:
1. An attraction system comprising:
character data generation means for generating character data which is an image of a character having a facial image of a visitor;
background data storage means for storing at least body data of the character;
synthesis means for synthesizing the facial image of the visitor with the body data of the character to create synthesized character data;
attraction picture generation means for causing the synthesized character data to move in accordance with character scenario data which specifies a movement of the character along an attraction story to generate an attraction picture in which the visitor acts as the character;
attraction picture providing means for providing the attraction picture;
voice data storage means storing male voice data and female voice data of each character in the attraction picture;
sex judgment means for judging sex of each visitor based on the image of the visitor;
selection means for selecting the male voice data or the female voice data of each character; and
output means for outputting voice of the voice data selected by the selection means; and
wherein the selection means selects the voice data corresponding to the sex of the visitor assigned to the character, based on a result of the judgment by the sex judgment means, and
wherein the facial image of the visitor excludes images of hair and ears of the visitor.
2. The attraction system according to claim 1,
wherein the character data generation means comprises a three-dimensional scanner apparatus for generating a three-dimensional image of the visitor to generate three-dimensional character data.
3. The attraction system according to claim 1,
wherein the three-dimensional scanner apparatus is provided in a pre-show room for providing a pre-show of an attraction, and the three-dimensional scanner apparatus generates images of visitors while the visitors are waiting for a main show of the attraction in the pre-show room.
4. The attraction system according to claim 1, comprising:
a scenario storage section for storing the character scenario data; and
wherein the background data storage means further stores a background image; and wherein the attraction picture generation means generates the attraction picture in which the character data moves in accordance with the character scenario data in the background image.

5. The attraction system according to claim 1, wherein the attraction picture generation means comprises expression changing means for changing facial expression of the character data in accordance with the character scenario data which specifies facial expression of the character along the attraction story to generate the attraction picture in which facial expression of the visitor changes.

6. The attraction system according to claim 1, comprising: means for providing the attraction picture for visitors on the Web.

7. An attraction providing method comprising:

generating character data which is an image of a character having a facial image of a visitor;

providing body data of the character;

synthesizing the facial image of the visitor with the body data of the character to create synthesized character data;

causing the synthesized character data to move in accordance with character scenario data which specifies a movement of the character along an attraction story to generate an attraction picture in which the visitor acts as the character;

providing the attraction picture;

storing male voice data and female voice data of each character in the attraction picture;

judging sex of each visitor based on the image of the visitor;

selecting voice data corresponding to the sex of the visitor assigned to the character from between the male voice data and the female voice data, based on a result of the sex judgment; and outputting the selected voice data, wherein the facial image of the visitor excludes images of hair and ears of the visitor.

* * * * *